United States Patent
Kawana et al.

(10) Patent No.: US 10,706,243 B2
(45) Date of Patent: Jul. 7, 2020

(54) INFORMATION PROCESSING APPARATUS AND INFORMATION PROCESSING METHOD

(71) Applicant: SONY CORPORATION, Tokyo (JP)

(72) Inventors: Yousuke Kawana, Tokyo (JP); Ryuichi Suzuki, Tokyo (JP); Kentaro Ida, Tokyo (JP); Mana Sasagawa, Tokyo (JP); Kaori Ikematsu, Tokyo (JP); Itiro Shiio, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/325,270

(22) PCT Filed: Jul. 14, 2017

(86) PCT No.: PCT/JP2017/025639
§ 371 (c)(1),
(2) Date: Feb. 13, 2019

(87) PCT Pub. No.: WO2018/042906
PCT Pub. Date: Mar. 8, 2018

(65) Prior Publication Data
US 2019/0205580 A1     Jul. 4, 2019

(30) Foreign Application Priority Data
Sep. 5, 2016 (JP) .............................. 2016-172495

(51) Int. Cl.
*G06K 7/10* (2006.01)
*G06K 17/00* (2006.01)
(Continued)

(52) U.S. Cl.
CPC ......... *G06K 7/10366* (2013.01); *G06F 16/00* (2019.01); *G06F 16/532* (2019.01); *G06F 16/5866* (2019.01); *G06K 17/00* (2013.01)

(58) Field of Classification Search
CPC ............ G06K 7/00; G06K 7/08; G06K 7/081
(Continued)

(56) References Cited

U.S. PATENT DOCUMENTS

2013/0211718 A1* 8/2013 Yoo ...................... G01C 21/206
                                                                      701/500
2014/0225914 A1* 8/2014 Kasahara ............... G06Q 30/02
                                                                      345/629

(Continued)

FOREIGN PATENT DOCUMENTS

JP      2005-257378 A     9/2005
JP      2016-045511 A     4/2016

OTHER PUBLICATIONS

International Search Report and Written Opinion of PCT Application No. PCT/JP2017/025639, dated Sep. 12, 2017, 09 pages of ISRWO.

(Continued)

*Primary Examiner* — Edwyn Labaze
(74) *Attorney, Agent, or Firm* — Chip Law Group

(57) ABSTRACT

To provide an information processing apparatus that can easily find a target object on the basis of information detected in searching. Provided is an information processing apparatus including a provision unit that provides marker information obtained when a marker on a route to a destination has been read, and information regarding an image captured when the marker has been read and an acquisition unit that acquires information regarding a marker to be read next, the information being generated on the basis of the provided marker information.

17 Claims, 17 Drawing Sheets

(51) Int. Cl.
 *G06F 16/00* (2019.01)
 *G06F 16/58* (2019.01)
 *G06F 16/532* (2019.01)

(58) Field of Classification Search
 USPC .................................. 235/451, 439, 435, 375
 See application file for complete search history.

(56) References Cited

U.S. PATENT DOCUMENTS

2016/0360561 A1* 12/2016 Lee ..................... H04N 5/23206
2017/0180121 A1* 6/2017 Hamachi ............... H04L 9/0822

OTHER PUBLICATIONS

Honda, et al., "Proposal of Shopping Navigation System for Low Vision", SIG Technical Reports.

Yamashita, et al., "UHF-tai RFID o Mochiita Shikaku Shogaisha Muke Okunai-yo Annai System no Kaihatsu to Tenjikai eno Tekiyo," IPSJ SIG Notes Consumer Device & System (CDS) 2016-CDS-016, May 26, 2016 (May 26, 2016), pp. 1 to 8.

Kobayashi, et al., "Implementation of the Navigation System using QR Code on Smart Phone," IPSJ SIG Notes 2012 (Heisei 24) Nendo 4 [CD-ROM], Dec. 15, 2012 (Dec. 15, 2012), pp. 1 to 8.

Ishii, et al., A Navigation System Using Ultrasonic Directional Speaker with Rotating Base, Springer-Verlag Berlin Heidelberg 2007, Human Interface, Part II, HCII 2007, pp. 526-535.

Honda, et al., "Proposal of Shopping Navigation System for Low Vision", 2012 Information Processing Society of Japan, IPSJ SIG Technical Report, 2012, pp. 1-10 (English Abstract only).

Yamashita, et al., "Development of a Indoor Navigation System with UHF-band RFID for the Visually Impaired People and Its Application to an Exhibition", IPSJ SIG Technical Report, vol. 2016-CDS-16 No. 7, Jun. 2, 2016, pp. 1-8.

Kobayashi, et al., "Implementation of the Navigation System using QR Code on Smart Phone", IPSJ SIG Technical Report, . Nov. 15, 2012, pp. 1-8. (English Abstract only).

"A Six-step Plan for Organizing Yourself, Your Office, and Your Life, Three Rivers Press", 1 page.

Ishii, et al., "A Navigation System Using Ultrasonic Directional Speaker with Rotating Base", Human Interface, Part II, HCII 2007, LNCS 4558, Springer-Verlag Berlin Heidelberg 2007, 526-535 pages.

L. Davenport, "Order from Chaos: A Six-step Plan for Organizing Yourself".

* cited by examiner

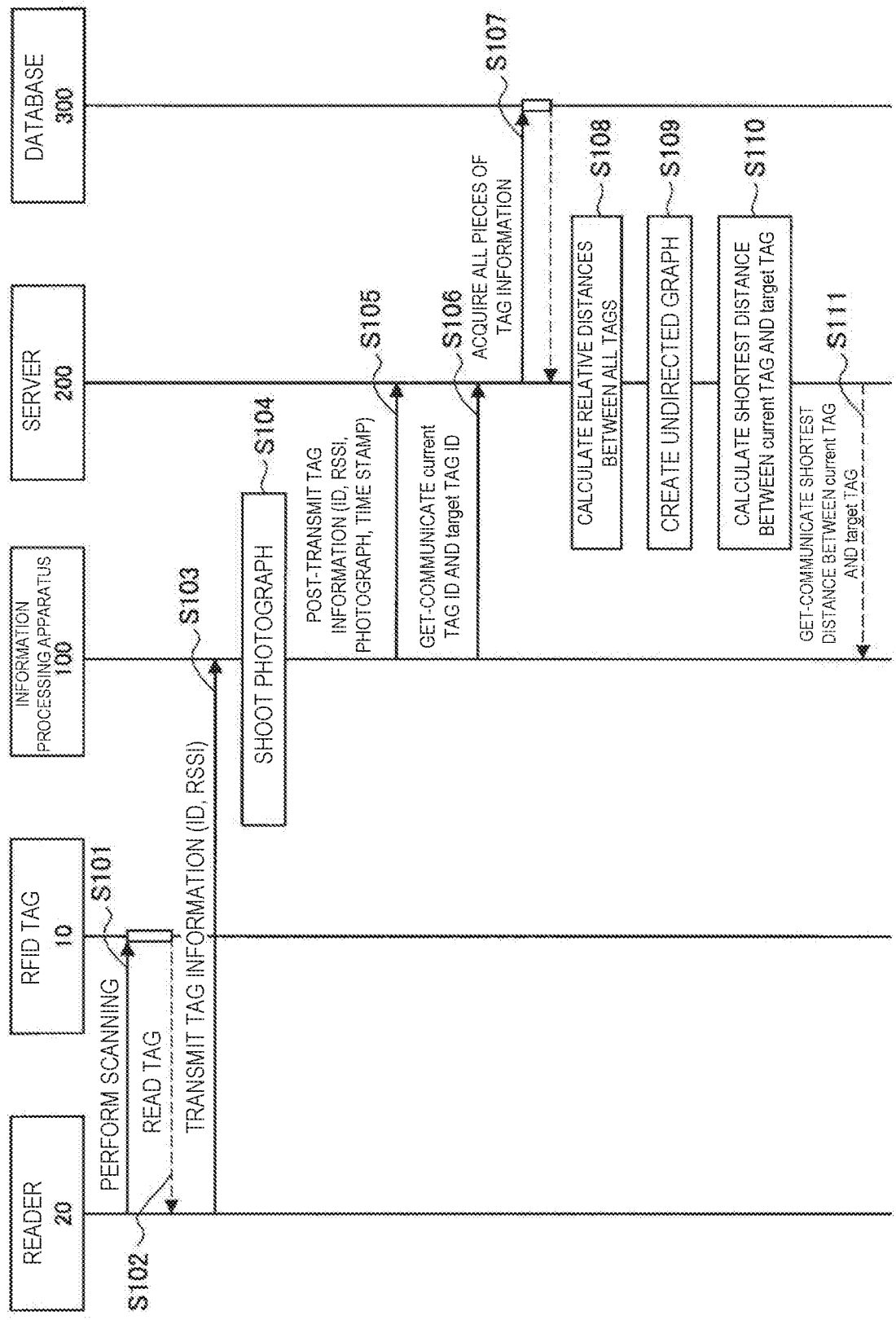

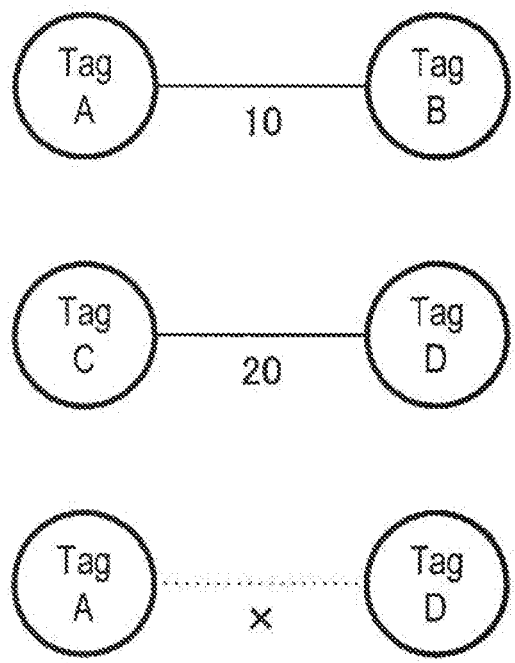

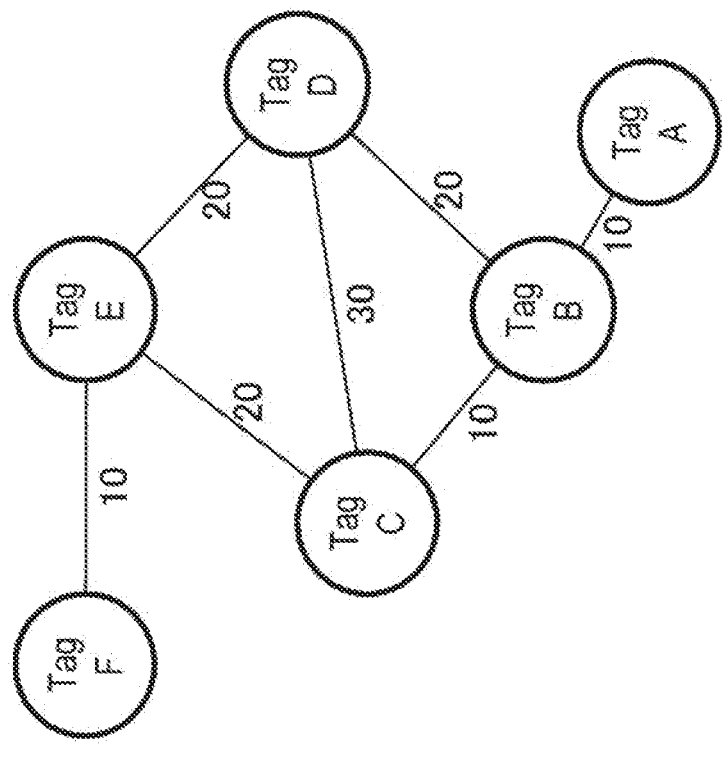
FIG. 10

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/025639 filed on Jul. 14, 2017, which claims priority benefit of Japanese Patent Application No. JP 2016-172495 filed in the Japan Patent Office on Sep. 5, 2016. Each of the above-referenced applications is hereby incorporated herein by reference in its entirety.

TECHNICAL FIELD

The present disclosure relates to an information processing apparatus, an information processing method, and a computer program.

BACKGROUND ART

People take a lot of time in searching in daily life, and a time taken for searching can be said to be a fruitless time in their lives. According to the statistics disclosed in Non-Patent Literature 1, it is said that a businessperson spends 150 hours a year searching for things necessary for business.

If it is possible to save such a time taken for searching, which is a fruitless time, more time can be fruitfully spent. For this purpose, a technology for saving a time taken for searching is also disclosed. For example, Non-Patent Literature 2 discloses a technology that can find out a search target object on the basis of information obtained when a tag is read, by attaching the tag readable by a reader from a remote location, to the search target object in advance.

CITATION LIST

Non-Patent Literature

Non-Patent Literature 1: Davenport, L.: Order from Chaos: A Six-step Plan for Organizing Yourself, Your Office, and Your Life, Three Rivers Press (2001).
Non-Patent Literature 2: Ishii, K., Yamamoto, Y., Imai, M. and Nakadai, K.: A Navigation System Using Ultrasonic Directional Speaker with Rotating Base, pp. 526-535, Springer Berlin Heidelberg (2007).

DISCLOSURE OF INVENTION

Technical Problem

When we usually perform searching, we see various ambient circumstances, other objects, and the like for searching for a target object. Thus, searching can be said to be a work of observing a living space and checking locations of various objects. Accordingly, in some cases, an object incidentally seen in the previous searching is easily found in the next searching.

In view of the foregoing, the present disclosure proposes an information processing apparatus, an information processing method, and a computer program that are novel and improved, and can easily find a target object on the basis of information detected in searching.

Solution to Problem

According to the present disclosure, there is provided an information processing apparatus including: a provision unit configured to provide marker information obtained when a marker on a route to a destination has been read, and information regarding an image captured when the marker has been read; and an acquisition unit configured to acquire information regarding a marker to be read next, the information being generated on the basis of the provided marker information.

In addition, according to the present disclosure, there is provided an information processing apparatus including: an acquisition unit configured to acquire marker information obtained when a marker on a route to a destination has been read, and information regarding an image captured when the marker has been read; and a provision unit configured to provide information regarding a marker to be read next, the information being generated on the basis of the marker information acquired by the acquisition unit.

In addition, according to the present disclosure, there is provided an information processing method including: providing marker information obtained when a marker on a route to a destination has been read, and information regarding an image captured when the marker has been read; and acquiring information regarding a marker to be read next, the information being generated on the basis of the provided marker information.

In addition, according to the present disclosure, there is provided an information processing method including: acquiring marker information obtained when a marker on a route to a destination has been read, and information regarding an image captured when the marker has been read; and providing information regarding a marker to be read next, the information being generated on the basis of the acquired marker information.

In addition, according to the present disclosure, there is provided a computer program for causing a computer to execute: providing marker information obtained when a marker on a route to a destination has been read, and information regarding an image captured when the marker has been read; and acquiring information regarding a marker to be read next, the information being generated on the basis of the provided marker information.

In addition, according to the present disclosure, there is provided a computer program for causing a computer to execute: acquiring marker information obtained when a marker on a route to a destination has been read, and information regarding an image captured when the marker has been read; and providing information regarding a marker to be read next, the information being generated on the basis of the acquired marker information.

Advantageous Effects of Invention

As described above, according to the present disclosure, an information processing apparatus, an information processing method, and a computer program that are novel and improved, and can easily find a target object on the basis of information detected in searching can be provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a flow chart illustrating an operation example of the entire information processing system 1 according to the embodiment.

FIG. 5 is an explanatory diagram illustrating an example of a relative distance between RFID tags 10.

FIG. 6 is an explanatory diagram illustrating, as a table, a relative distance between each pair among four RFID tags 10.

FIG. 10 is an explanatory diagram illustrating information regarding relative distances between RFID tags 10 and an example of an undirected graph generated on the basis of the information.

MODE(S) FOR CARRYING OUT THE INVENTION

Figure 1:
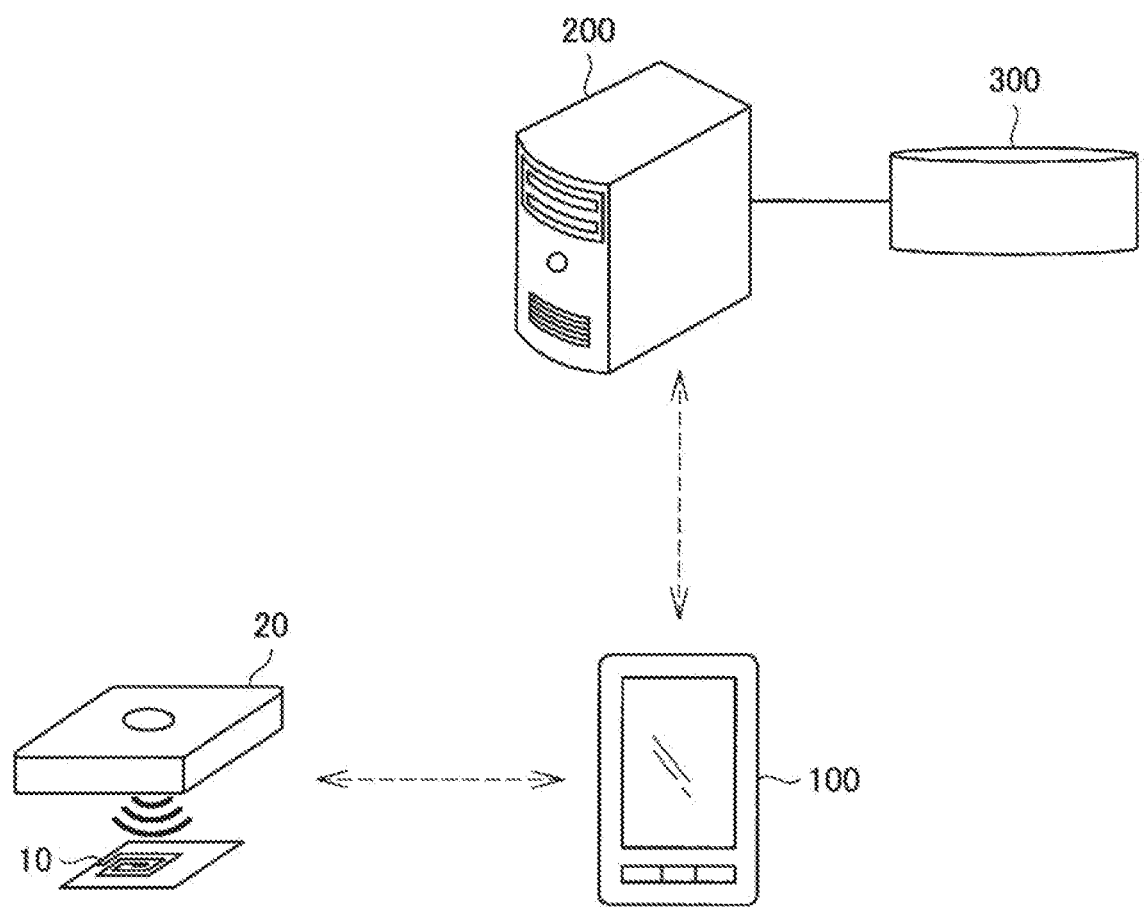
FIG. 1 is an explanatory diagram illustrating a configuration example of an information processing system 1 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Embodiment of Present Disclosure
1.1. Overview
1.2. Configuration Example
1.3. Operation Example
2. Hardware Configuration Example
3. Conclusion

1. Embodiment of Present Disclosure

1.1. Overview

First of all, an overview of an embodiment of the present disclosure will be described in detail.

People take a lot of time in searching in daily life, and a time taken for searching can be said to be a fruitless time in their lives. As described above, according to the statistics disclosed in Non-Patent Literature 1, it is said that a businessperson spends 150 hours a year searching for things necessary for business.

If it is possible to save such a time taken for searching, which is a fruitless time, more time can be fruitfully spent. For this purpose, a technology for saving a time taken for searching is also disclosed. For example, Non-Patent Literature 2 discloses a technology that can find out a search target object on the basis of information obtained when a tag is read, by attaching the tag readable by a reader from a remote location, to the search target object in advance.

Nevertheless, as in the technology disclosed in Non-Patent Literature 2, a technology of attaching a tag to an object forces a user to perform a bothersome work of attaching a tag to an object and then registering a relationship between the tag and the object in a server. More specifically, for example, it is necessary to cause the user to register information such as a position of a tag and a name of an object to which the tag is attached, and causing the user to perform a registration work of such information for each tag becomes a very heavy burden for the user. Accordingly, as the number of tags increases, a burden of registration to a server that is to be imposed on the user increases.

When we usually perform searching, we see various ambient circumstances, other objects, and the like for searching for a target object. Thus, searching can be said to be a work of observing a living space and checking locations of various things. Accordingly, in some cases, an object incidentally seen in the previous searching is easily found in the next searching.

In other words, in a system that assists searching, if it is possible to effectively utilize information regarding another object found while a person is performing searching, the information is considered to be very useful in subsequent searching.

Thus, in view of the foregoing points, a disclosing party of the present application has earnestly studied a technology that can cause a user to easily find a target object by effectively utilizing information regarding another object found while searching is being performed. As a result, the disclosing party of the present application has eventually devised a technology that can cause a user to easily find a target object by effectively utilizing information regarding another object found while searching is being performed, as described below.

The overview of the embodiment of the present disclosure has been described above.

1.2. Configuration Example

System Configuration Example

Subsequently, an embodiment of the present disclosure will be described in detail. First of all, a configuration example of an information processing system according to an embodiment of the present disclosure will be described.

FIG. 1 is an explanatory diagram illustrating a configuration example of an information processing system 1 according to an embodiment of the present disclosure. Hereinafter, a configuration example of the information processing system 1 according to an embodiment of the present disclosure will be described in detail using FIG. 1.

The information processing system 1 illustrated in FIG. 1 is a system intended for causing a user to effectively perform searching. The information processing system 1 includes a reader 20, an information processing apparatus 100, a server apparatus 200, and a database 300. In addition, as advance preparation of searching, the user attaches RFID tags 10 being passive RFID tags, to appropriate locations in a room. Objects to which the RFID tags 10 are to be attached may be any object such as a stationary object such as a wall, a rarely-moved object such as pieces of furniture including shelves and tables, and a frequently-moved object such as a remote controller and glasses.

The reader 20 is an apparatus that emits radio waves of a predetermined frequency, and is an apparatus carried by the user that performs searching in the room. The reader 20 reads a tag ID from a RFID tag 10 by being brought close to the RFID tag 10 being a passive RFID tag. When the reader 20 reads a tag ID from the RFID tag 10, the reader 20 transmits tag information including the read tag ID, to the information processing apparatus 100. The tag information includes a received signal strength indicator (RSSI), for example. Radio communication that is based on the IEEE 802.15.1 standard that uses 2.4 GHz band, for example, is performed between the reader 20 and the information processing apparatus 100.

The information processing apparatus 100 is an apparatus carried by the user that performs searching in the room, together with the reader 20. The information processing apparatus 100 is an apparatus suitable for being carried by the user, such as a smartphone, a tablet mobile terminal, and a glasses-type or wristwatch-type wearable device, for example, and is illustrated in the form of a smartphone in FIG. 1.

In the present embodiment, the information processing apparatus 100 has an imaging function. When the information processing apparatus 100 receives the tag information from the reader 20, the information processing apparatus 100 executes an imaging process. The information processing apparatus 100 can thereby captures an image of an ambient circumstance caused when the reader 20 has read the RFID tag 10. The image of the ambient circumstance caused when the reader 20 has read the RFID tag 10 can be utilized for subsequent searching performed by the user.

When the information processing apparatus 100 receives the tag information from the reader 20 and executes the imaging process, the information processing apparatus 100 transmits the tag information of the RFID tag 10, a captured image, and other information to the server apparatus 200. As the other information, for example, a time at which the tag information has been received can be included.

On the basis of the information transmitted from the information processing apparatus 100, the server apparatus 200 provides information to the information processing apparatus 100. In the present embodiment, on the basis of the tag information of the RFID tag 10, the captured image, and the other information that have been transmitted from the information processing apparatus 100, the server apparatus 200 generates information regarding a RFID tag 10 to be read next by the user using the reader 20, and provides the information regarding the RFID tag 10 to be read, to the information processing apparatus 100.

In the present embodiment, when generating the information regarding the RFID tag 10 to be read next, the server apparatus 200 refers to data stored in the database 300. On the basis of the information transmitted from the information processing apparatus 100, information indicating a relative relationship between tags is stored into the database 300. Then, the server apparatus 200 creates an undirected graph from the information indicating a relative relationship between tags that is stored in the database 300, and generates the information regarding the RFID tag 10 to be read next, from the undirected graph.

The configuration example of the information processing system 1 according to an embodiment of the present disclosure has been described above using FIG. 1. Subsequently, a functional configuration example of the information processing apparatus 100 according to an embodiment of the present disclosure will be described.

Configuration Example of Information Processing Apparatus 100

Figure 2:
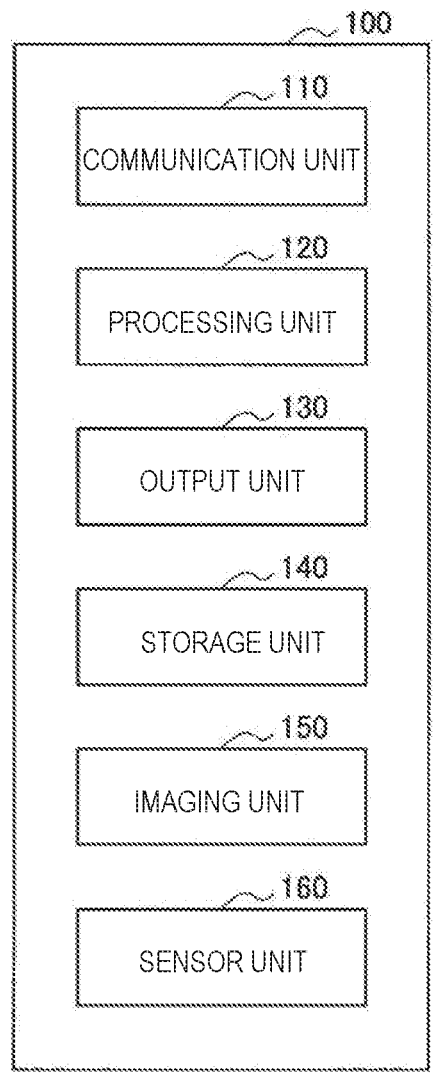
FIG. 2 is an explanatory diagram illustrating a functional configuration example of an information processing apparatus 100 according to the embodiment.

FIG. 2 is an explanatory diagram illustrating a functional configuration example of the information processing apparatus 100 according to an embodiment of the present disclosure. Hereinafter, a functional configuration example of the information processing apparatus 100 according to an embodiment of the present disclosure will be described using FIG. 2.

As illustrated in FIG. 2, the information processing apparatus 100 according to an embodiment of the present disclosure includes a communication unit 110, a processing unit 120, an output unit 130, a storage unit 140, an imaging unit 150, and a sensor unit 160.

The communication unit 110 executes a process of communication with another apparatus. In the present embodiment, the communication unit 110 executes radio communication with the reader 20 that is based on the IEEE 802.15.1 standard that uses 2.4 GHz band, and a process of communication with the server apparatus 200. The communication unit 110 can function as a provision unit or an acquisition unit of the present disclosure.

The processing unit 120 includes a central processing unit (CPU), a read only memory (ROM), a random access memory (RAM), and the like, for example, and executes various processes in the information processing apparatus 100. For example, the processing unit 120 performs information output to the output unit 130 that is based on information received by the communication unit 110 from the server apparatus 200. In addition, for example, when the communication unit 110 receives tag information from the reader 20, the processing unit 120 causes the imaging unit 150 to execute the imaging process and acquires an image.

On the basis of control performed by the processing unit 120, the output unit 130 performs output of various types of information. The output unit 130 can include a display, a speaker, a light emitting diode (LED), a vibrator, or the like, for example.

In the present embodiment, on the basis of information received by the communication unit 110 from the server apparatus 200, the output unit 130 outputs information regarding a tag to be read next by the user holding the reader 20. The details of the information regarding a tag to be read next by the user holding the reader 20 that is to be output by the output unit 130 will be described later.

The storage unit 140 includes a nonvolatile memory such as a flash memory, for example, and stores a computer program for operating the information processing apparatus 100, information received by the communication unit 110, an image captured by the imaging unit 150, and the like.

The imaging unit 150 includes a lens, an image sensor, an A/D converter, and the like. In the present embodiment, as described above, when the communication unit 110 receives tag information from the reader 20, the imaging unit 150 executes the imaging process on the basis of control of the processing unit 120. In other words, the imaging unit 150 captures an image of an ambient circumstance caused at a time point at which the tag information has been received from the reader 20.

The sensor unit 160 includes at least any sensor of various sensors such as a positioning sensor, an acceleration sensor, a gyro sensor, a geomagnetic sensor, an illuminance sensor, a temperature sensor, a barometric sensor, or a heartbeat sensor, for example. Note that specific examples of the above-described positioning sensor can include a global navigation satellite system (GNSS) receiver, a communication apparatus, and/or the like. Examples of the GNSS can include the global positioning system (GPS), the Global Navigation Satellite System (GLONASS), the BeiDou Navigation Satellite System (BDS), a Quasi-Zenith Satellites System (QZSS), the Galileo, or the like. In addition, examples of the positioning sensor can include sensors that detect positions using technologies such as a wireless local area network (LAN), Multi-Input Multi-Output (MIMO), cellular communication (e.g. position detection that uses a portable base station, femtocell), Near Field Communication, or the like.

Note that the above-described various sensors need not be provided in the information processing apparatus 100. In other words, the above-described various sensors may be put on the body of the user that scans the RFID tags 10 using the reader 20.

The functional configuration example of the information processing apparatus 100 according to an embodiment of the present disclosure has been described above using FIG. 2. Subsequently, a functional configuration example of the server apparatus 200 according to an embodiment of the present disclosure will be described.

Configuration Example of Server Apparatus 200

Figure 3:
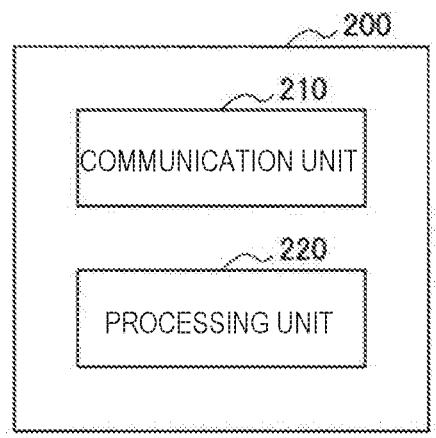
FIG. 3 is an explanatory diagram illustrating a functional configuration example of a server apparatus 200 according to the embodiment.

FIG. 3 is an explanatory diagram illustrating a functional configuration example of the server apparatus 200 according to an embodiment of the present disclosure. Hereinafter, a functional configuration example of the server apparatus 200 according to an embodiment of the present disclosure will be described using FIG. 3.

As illustrated in FIG. 3, the server apparatus 200 according to an embodiment of the present disclosure includes a communication unit 210 and a processing unit 220.

The communication unit 210 executes a process of communication with another apparatus. In the present embodiment, the communication unit 210 executes a process of communication with the information processing apparatus 100 and the database 300. The communication unit 210 can function as a provision unit or an acquisition unit of the present disclosure.

The processing unit 220 includes a CPU, a ROM, a RAM, and the like, for example, and executes various processes in the information processing apparatus 100. In the present embodiment, the processing unit 220 stores information transmitted from the information processing apparatus 100 in accordance with scanning of the RFID tag 10 that is performed by the reader 20, into the database 300, and generates, from the information stored in the database 300, information regarding a tag to be read next by the user holding the reader 20.

The functional configuration example of the server apparatus 200 according to an embodiment of the present disclosure has been described above using FIG. 3. Subsequently, an operation example of the information processing system 1 according to an embodiment of the present disclosure will be described.

1.3. Operation Example

Operation Example of Entire System

First of all, an operation example of the entire information processing system 1 according to an embodiment of the present disclosure will be described. FIG. 4 is a flow chart illustrating an operation example of the entire information processing system 1 according to an embodiment of the present disclosure. Hereinafter, an operation example of the entire information processing system 1 according to an embodiment of the present disclosure will be described using FIG. 4.

As described above, in the information processing system 1 according to an embodiment of the present disclosure, RFID tags 10 are attached to everywhere in the room. By scanning the attached RFID tags 10 in advance using the reader 20, tag information is accumulated in the database 300. By the tag information being accumulated in the database 300, convenience of searching for the user is enhanced.

Before the start of a series of processes illustrated in FIG. 4, the user inputs, to the information processing apparatus 100, a destination, that is to say, information regarding an object that the user desires to search for. The information regarding an object that the user desires to search for may be input by being selected from among images captured in the past by the imaging unit 150 in accordance with the reception of tag information from the reader 20, for example. By performing selection from among the images captured in accordance with the reception of tag information, a tag ID of a corresponding RFID tag 10 is identified.

The user scans a RFID tag 10 using the reader 20 (step S101). The RFID tag 10 operates in response to radio waves from the reader 20 and transmits a tag ID. By receiving the tag ID from the RFID tag 10, the reader 20 completes reading of the tag (step S102). Note that, when scanning the RFID tag 10, the reader 20 can possibly scan a plurality of RFID tags 10. Whether the reader 20 has scanned a plurality of RFID tags 10 is used in the calculation of whether the RFID tags 10 are close.

When the reader 20 receives the tag ID from the RFID tag 10, the reader 20 transmits tag information including the received tag ID and a received signal strength indicator (RSSI) at the time point, to the information processing apparatus 100 (step S103). As described above, for example, radio communication that is based on the IEEE 802.15.1 standard that uses 2.4 GHz band is performed between the reader 20 and the information processing apparatus 100.

When the information processing apparatus 100 receives the tag information from the reader 20, the information processing apparatus 100 causes the imaging unit 150 to execute the imaging process and shoots a photograph (step S104). More specifically, the information processing apparatus 100 captures an image of an ambient environment caused at the time point at which the tag information has been received from the reader 20. The image captured by the imaging unit 150 can be stored into the storage unit 140.

When the information processing apparatus 100 receives the tag information from the reader 20, the information processing apparatus 100 may store sensing data obtained by the sensor unit 160 at the time point at which the tag information has been received from the reader 20, into the storage unit 140.

Then, the information processing apparatus 100 transmits the tag information received from the reader 20, the image captured by the imaging unit 150, and a time stamp indicating a reception time of the tag information, to the server apparatus 200 (step S105). Communication performed here is POST communication.

In addition, the information processing apparatus 100 transmits the tag ID read in step S102, as a current tag ID, and in addition, a tag ID of a target RFID tag 10 as a target tag ID, to the server apparatus 200 (step S106). Communication performed here is GET communication.

When the server apparatus 200 receives the current tag ID and the target tag ID from the information processing apparatus 100, the server apparatus 200 acquires all pieces of tag information from the database 300 (step S107).

When all pieces of tag information are acquired from the database 300, the server apparatus 200 calculates relative distances between all RFID tags 10 (step S108). The calculation of the relative distances between the RFID tags 10 is executed by the processing unit 220, for example.

FIG. 5 is an explanatory diagram illustrating an example of a relative distance between RFID tags 10. FIG. 5 illustrates examples of relative distances between Tag A and Tag B, between Tag C and Tag D, and between Tag A and Tag D. In the present embodiment, relative distances are represented at ten intervals in the order of closer distances like 10, 20, and so on. It should be appreciated that a way of representing relative distances is not limited to this example. Note that, in an initial state, all RFID tags 10 are assumed to have relative distances with the other RFID tags 10 that correspond to NULL (not close).

In the examples illustrated in FIG. 5, it is indicated that the relative distance between Tag A and Tag B is 10, the relative distance between Tag C and Tag D is 20, and the relative distance between Tag A and Tag D is NULL (not close). In addition, FIG. 6 is an explanatory diagram illustrating, as a table, a relative distance between each pair among four RFID tags 10. In the table illustrated in FIG. 6, "x" indicates same RFID tags 10 or relatively separated RFID tags 10. More specifically, it is indicated that Tag A is relatively separated from Tag C and Tad D.

An example of a method of calculating a relative distance between RFID tags 10 that is to be used by the server apparatus 200 will be described. In the present embodiment, the server apparatus 200 calculates relative distances between RFID tags 10 depending on whether a plurality of RFID tags 10 have been read by one scanning performed by the reader 20.

Figure 7:
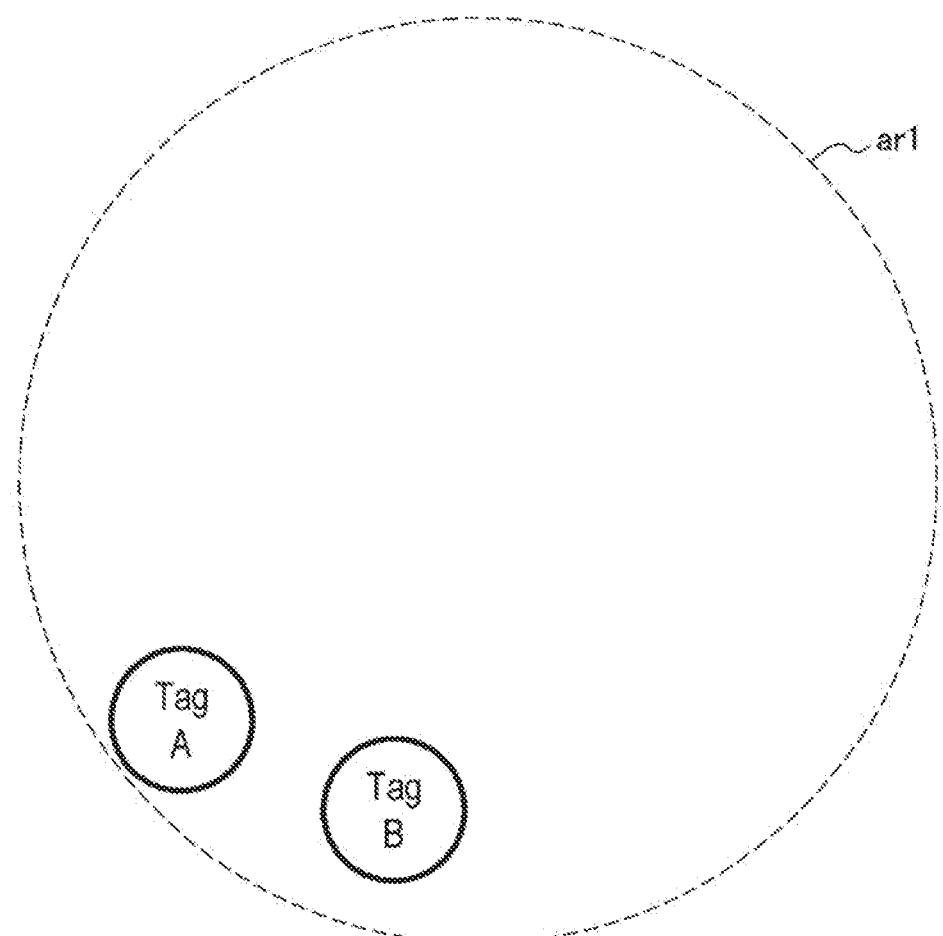
FIG. 7 is an explanatory diagram illustrating that two RFID tags 10 (Tag A and Tag B) have been read by one scanning performed by a reader 20.

FIG. 7 is an explanatory diagram illustrating that two RFID tags 10 (Tag A and Tag B) have been read by one scanning performed by the reader 20. A broken line denoted by a reference sign ar1 in FIG. 7 indicates an access range of radio waves emitted by the reader 20. In other words, if a RFID tag 10 is present inside the broken line denoted by the reference sign ar1, it means that the RFID tag 10 can be read by scanning performed by the reader 20.

In a case where two RFID tags 10 have been read by one scanning performed by the reader 20, as in FIG. 7, the server apparatus 200 determines that these RFID tags 10 are present at relatively close positions, and calculates a relative distance between these RFID tags 10 as 10.

Figure 8:
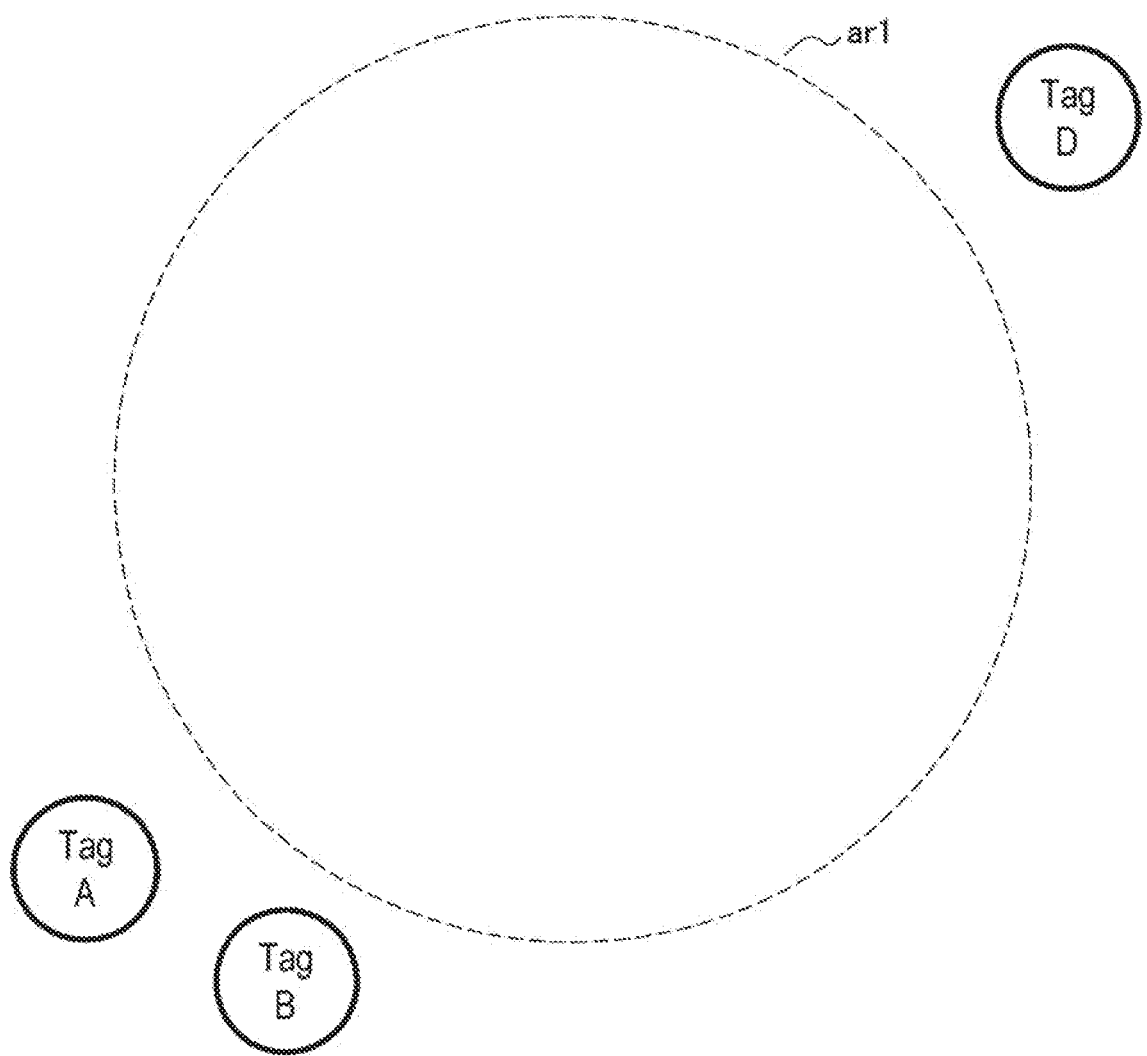
FIG. 8 is an explanatory diagram illustrating that no RFID tag 10 can be read by one scanning performed by the reader 20.

FIG. 8 is an explanatory diagram illustrating that no RFID tag 10 can be read by one scanning performed by the reader 20. In this manner, in a case where no RFID tag 10 can be read by one scanning performed by the reader 20, the server apparatus 200 determines that RFID tags 10 other than the RFID tags 10 determined to be present at the relatively close positions are relatively separated. In the example illustrated in FIG. 8, the server apparatus 200 determines that Tag D is relatively separated from Tag A and Tag B.

Figure 9:
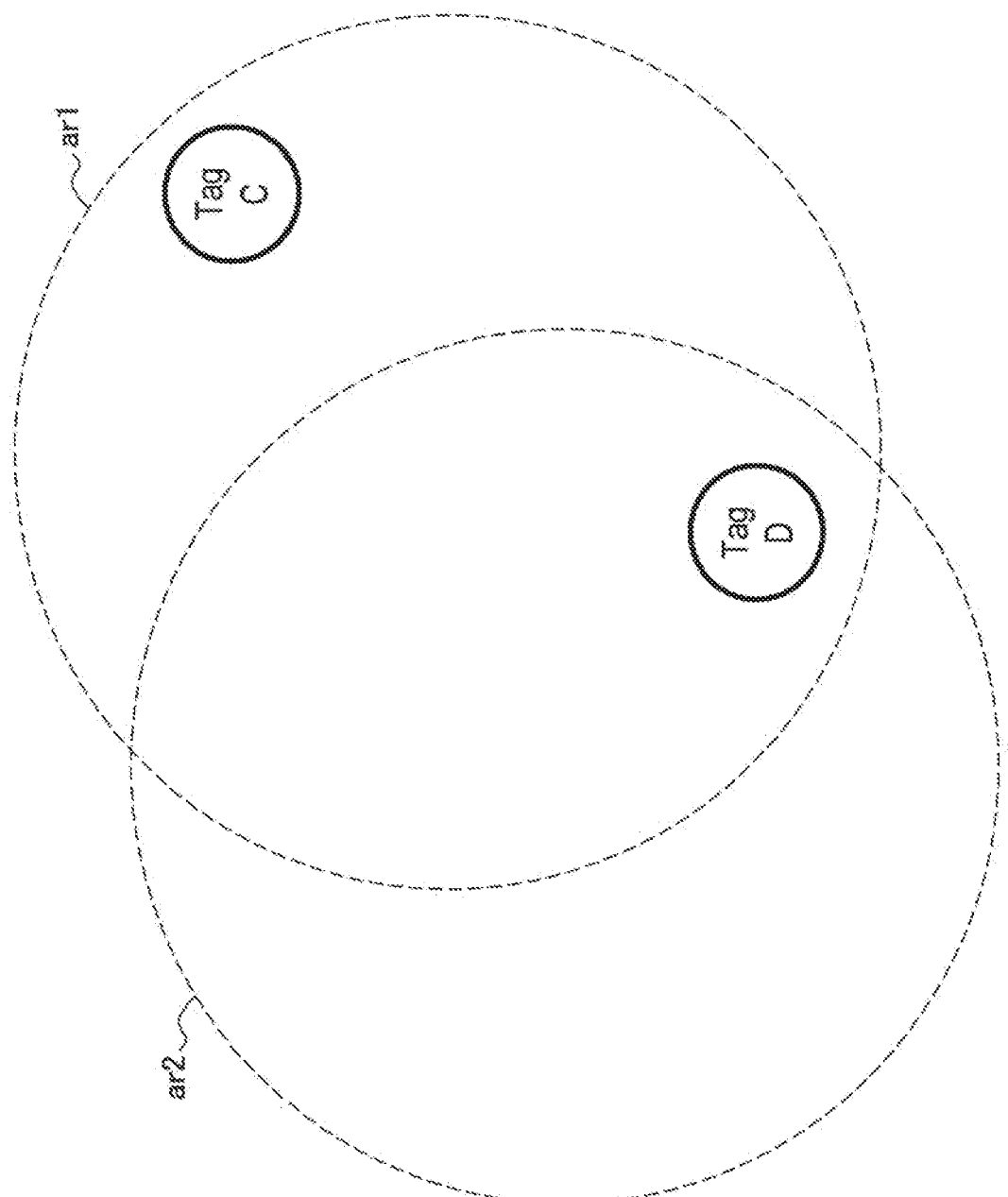
FIG. 9 is an explanatory diagram illustrating an example in a case where two RFID tags 10 have been read by one scanning performed by the reader 20, but only one RFID tag 10 of the two has been read at the time of another scanning.

There can be possibly caused a case where two RFID tags 10 have been read by one scanning performed by the reader 20, but only one RFID tag 10 of the two has been read at the time of another scanning. FIG. 9 is an explanatory diagram illustrating an example in a case where two RFID tags 10 have been read by one scanning performed by the reader 20, but only one RFID tag 10 of the two has been read at the time of another scanning. Broken lines denoted by reference signs ar1 and ar2 in FIG. 9 indicate access ranges of radio waves emitted by the reader 20.

Because two RFID tags 10 (Tag C and Tag D) have been read by one scanning performed by the reader 20, the server apparatus 200 calculates a relative distance between these RFID tags 10 as 10. Nevertheless, at the time of another scanning performed by the reader 20, only one RFID tag 10 (Tag D) has been read. In this case, the server apparatus 200 adds 10 to the relative distance between Tag C and Tag D, and updates the relative distance to 20.

In this manner, information regarding a relative distance between RFID tags 10 can occasionally vary depending on a result of scanning performed by the reader 20. Then, as the number of times of scanning performed by the reader 20 increases, reliability of the information regarding a relative distance between RFID tags 10 is enhanced.

When relative distances between all the RFID tags 10 are calculated in step S108, subsequently, the server apparatus 200 creates an undirected graph on the basis of information regarding relative distances between the RFID tags 10 (step S109). The undirected graph is created by the processing unit 220.

A creation example of an undirected graph that is based on information regarding relative distances between RFID tags 10 will be described. FIG. 10 is an explanatory diagram illustrating information regarding relative distances between RFID tags 10 and an example of an undirected graph generated on the basis of the information.

For example, when the server apparatus 200 calculates information regarding relative distances between RFID tags 10 as in FIG. 10, the server apparatus 200 generates an undirected graph as in FIG. 10 on the basis of the calculation result. The generated undirected graph is used for the generation of information regarding a tag that the user holding the reader 20 is to target next for heading for a destination.

Note that RFID tags 10 are not always attached to a stationary object such as a wall, and to a rarely-moved object such as other pieces of furniture including shelves and tables. In other words, the RFID tags 10 can be attached to a frequently-moved object such as glasses, a remote controller, and a pencil case.

Accordingly, even if the server apparatus 200 creates an undirected graph once, whether the undirected graph is always appropriate is uncertain. More specifically, even if a relative distance between certain two RFID tags 10 is 10 at a certain time point, a relative distance between the two RFID tags 10 may change to 50 at another time point.

Thus, the server apparatus 200 may weight sides when creating an undirected graph. More specifically, if a certain RFID tag 10 is attached to a remote controller and its position is liable to variation, weights of sides connecting to the RFID tag 10 may be reduced. Then, when calculating a shortest distance, the server apparatus 200 may perform calculation in such a manner as to exclude a side with a light weight even if a route passing through the side is a route with the shortest distance.

When an undirected graph is generated in step S109, subsequently, the server apparatus 200 calculates a shortest distance between a RFID tag 10 corresponding to the current tag ID, and a RFID tag 10 corresponding to the target tag ID (step S110). The shortest distance between the two RFID tags 10 is calculated by the processing unit 220 on the basis of the undirected graph generated in step S109.

An example of a calculation method of a shortest distance between two RFID tags 10 will be described. A shortest distance between two RFID tags 10 can be calculated using the Dijkstra's algorithm, for example.

Figure 11:
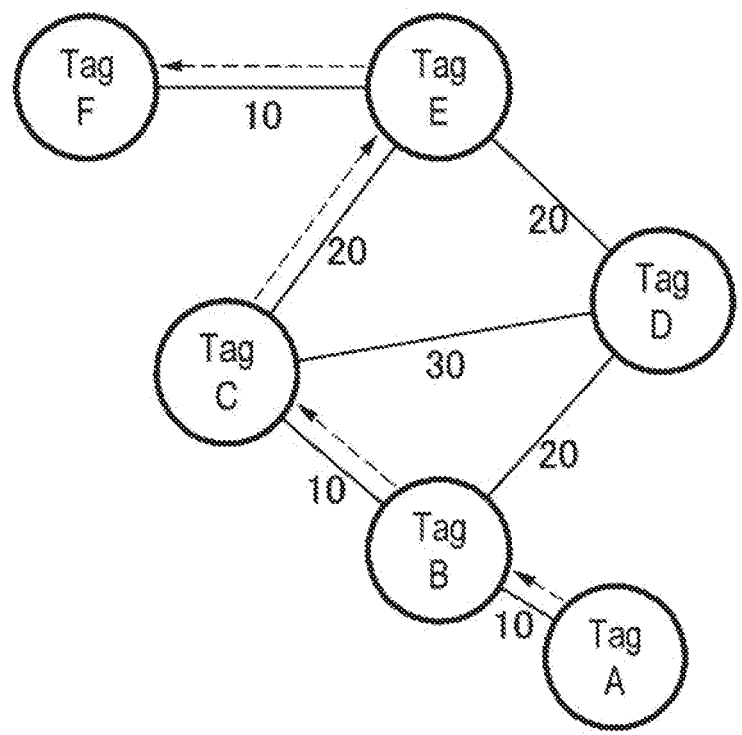
FIG. 11 is an explanatory diagram illustrating an example in a case where a shortest distance between Tag A and Tag F is calculated using a Dijkstra's algorithm in the undirected graph illustrated in FIG. 10.

FIG. 11 is an explanatory diagram illustrating an example in a case where a shortest distance between Tag A and Tag F is calculated using the Dijkstra's algorithm in the undirected graph illustrated in FIG. 10. When the Dijkstra's algorithm is used, it can be seen that a route between Tag A and Tag F that has a shortest distance is a route passing through Tag B, Tag C, and Tag E. Accordingly, in a case where the reader 20 reads Tag A, it can be seen that a RFID tag 10 to be scanned next is Tag B.

When the shortest distance between the RFID tag 10 corresponding to the current tag ID, and the RFID tag 10 corresponding to the target tag ID is calculated, subsequently, the server apparatus 200 transmits a shortest distance between the RFID tag 10 corresponding to the target tag ID, to the information processing apparatus 100 (step S111). The communication performed in step S111 is POST communication corresponding to the GET communication performed in step S106. In addition, the server apparatus 200 together transmits, to the information processing apparatus 100, information regarding a RFID tag 10 to be scanned next by the reader 20, as well. The information regarding a RFID tag 10 to be scanned by the reader 20 also includes an image captured by the information processing apparatus 100 at the time of scanning of the RFID tag 10. In addition, the server apparatus 200 may directly provide the generated undirected graph to the information processing apparatus 100.

By each apparatus executing the above-described series of operations, the information processing system 1 according to an embodiment of the present disclosure can present, to the information processing apparatus 100, information regarding a RFID tag 10 to be scanned next by the user performing searching, using the reader 20.

Note that, if a RFID tag 10 scanned using the reader 20 in step S101 described above is a target tag, the server apparatus 200 may transmit, to the information processing apparatus 100, information indicating that the RFID tag 10 is a target tag, without transmitting, to the information processing apparatus 100, information regarding a RFID tag 10 to be scanned next using the reader 20.

The operation example of the entire information processing system 1 according to an embodiment of the present disclosure has been described above using FIG. 4. Subsequently, an example of a user interface of the information processing apparatus 100 will be described.

Figure 12:
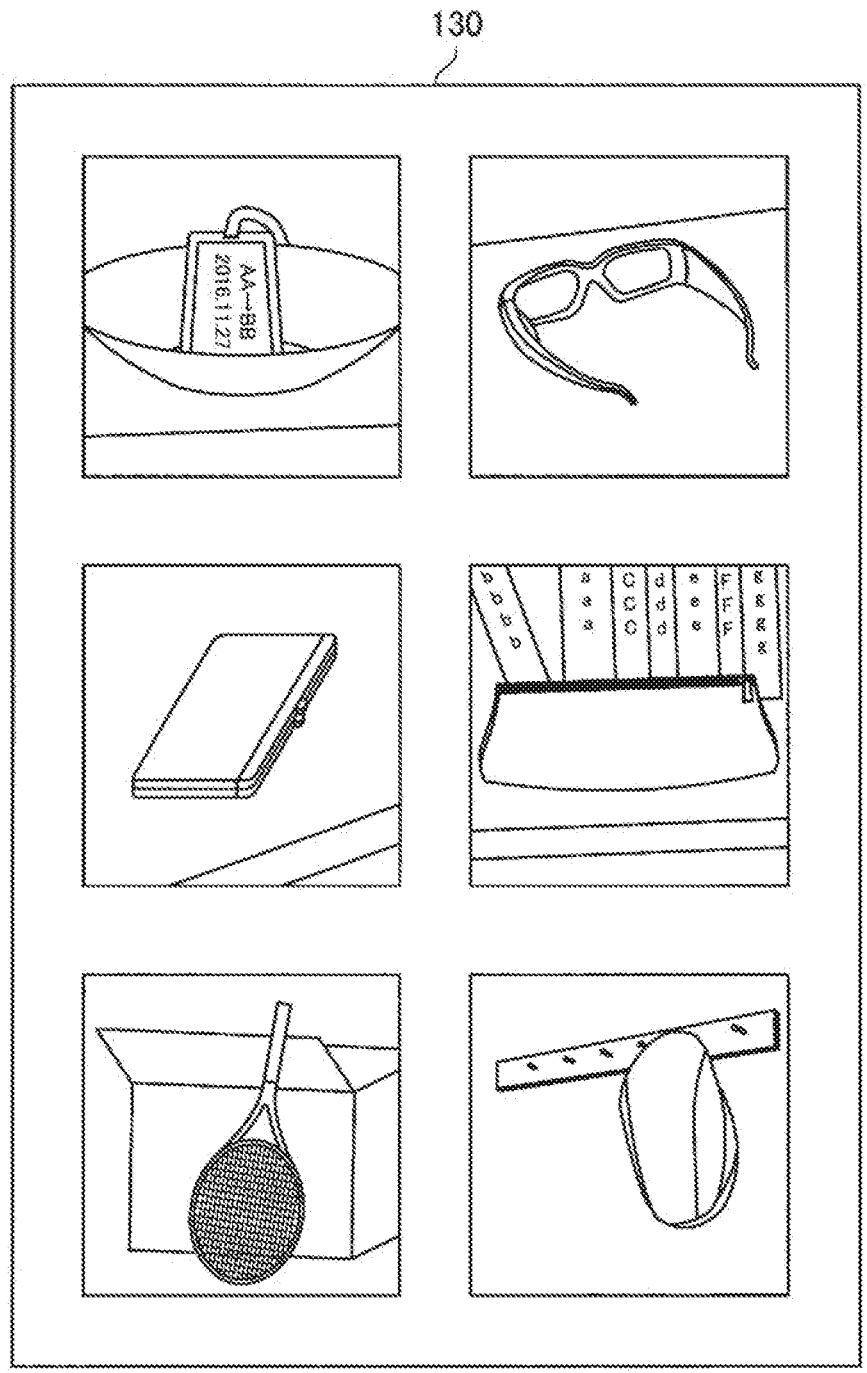
FIG. 12 is an explanatory diagram illustrating an example of a user interface output by the information processing apparatus 100.

First of all, an example of a user interface output by the information processing apparatus 100 when an object that the user desires to search for is input to the information processing apparatus 100 is illustrated. FIG. 12 is an explanatory diagram illustrating an example of a user interface output by the information processing apparatus 100. FIG. 12 illustrates a state in which a user interface for prompting the user to input an object that the user desires to search for is output on the output unit 130.

In the example illustrated in FIG. 12, a user interface in which images of objects that the user desires to search for are displayed in a grid is illustrated. The images are images captured so far by the information processing apparatus 100 when the user has scanned RFID tags 10 using the reader 20. More specifically, when one image is selected from among the images output on the output unit 130, a tag ID of a RFID tag 10 corresponding to the selected image is decided.

Figure 13:
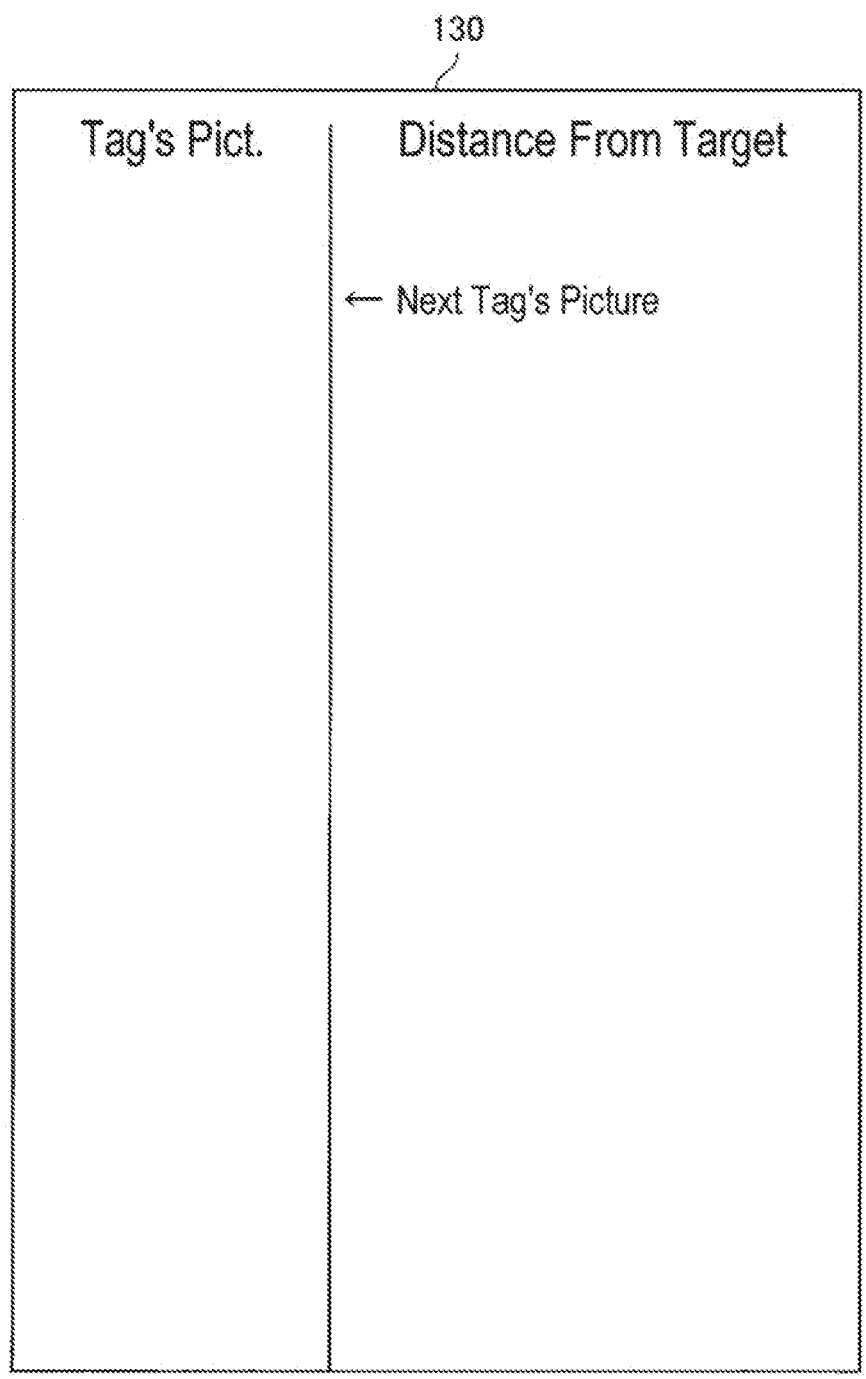
FIG. 13 is an explanatory diagram illustrating an example of a user interface output by the information processing apparatus 100.

Next, an example of a user interface output by the information processing apparatus 100 when the user is performing searching is illustrated. FIG. 13 is an explanatory diagram illustrating an example of a user interface output by the information processing apparatus 100. FIG. 13 illustrates a state in which a user interface output by the information processing apparatus 100 when the user is performing searching is output on the output unit 130.

When a RFID tag 10 is scanned using the reader 20, the user interface illustrated in FIG. 13 displays an image captured by the information processing apparatus 100 in accordance with the scanning, and an image of a RFID tag 10 to be scanned next by the user.

Figure 14:
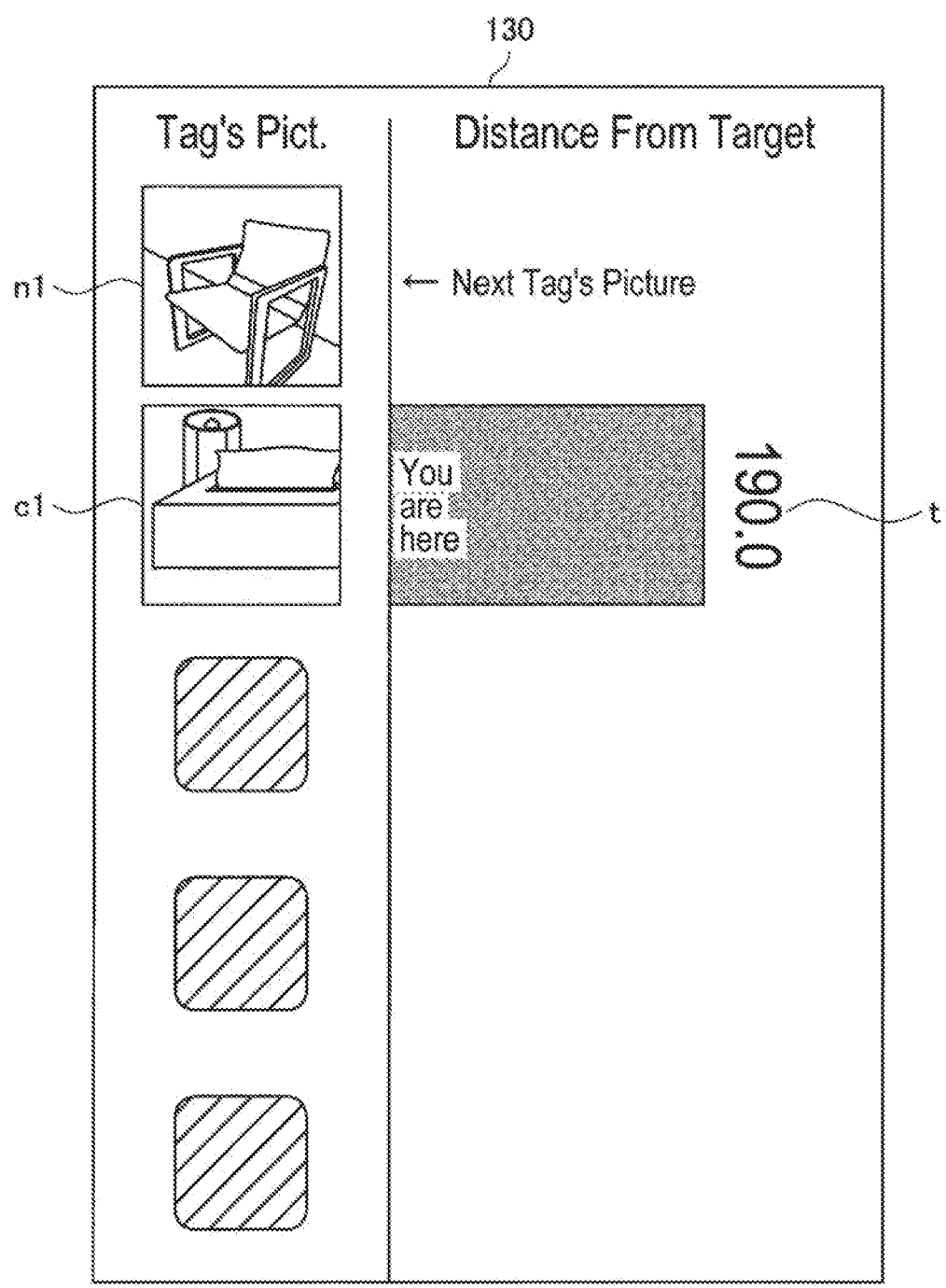
FIG. 14 is an explanatory diagram illustrating an example of a user interface output by the information processing apparatus 100.

FIG. 14 is an explanatory diagram illustrating an example of a user interface output by the information processing apparatus 100. FIG. 14 illustrates a state in which a user interface displayed when a RFID tag 10 is first scanned using the reader 20 since the user has input an object that the user desires to search for is output on the output unit 130.

When the user scans a RFID tag 10 using the reader 20, the information processing apparatus 100 outputs an image c1 captured by the imaging unit 150 in accordance with the scanning, to the user interface. In addition, when the user scans a RFID tag 10 using the reader 20, the information processing apparatus 100 acquires an image n1 corresponding to a RFID tag 10 to be scanned next by the user using the reader 20, and a shortest distance t1 between a RFID tag 10 corresponding to the target tag ID, from the server apparatus 200, and outputs the image n1 and the shortest distance t1 to the user interface. The shortest distance t1 between the RFID tag 10 corresponding to the target tag ID may be displayed by a bar chart and a numerical value as illustrated in FIG. 14, for example, but a display form of the shortest distance t1 is not limited to this example.

The information processing apparatus 100 outputs histories of images captured by the imaging unit 150 in accordance with scanning, and shortest distances between the RFID tag 10 corresponding to the target tag ID, to the user interface.

Figure 15:
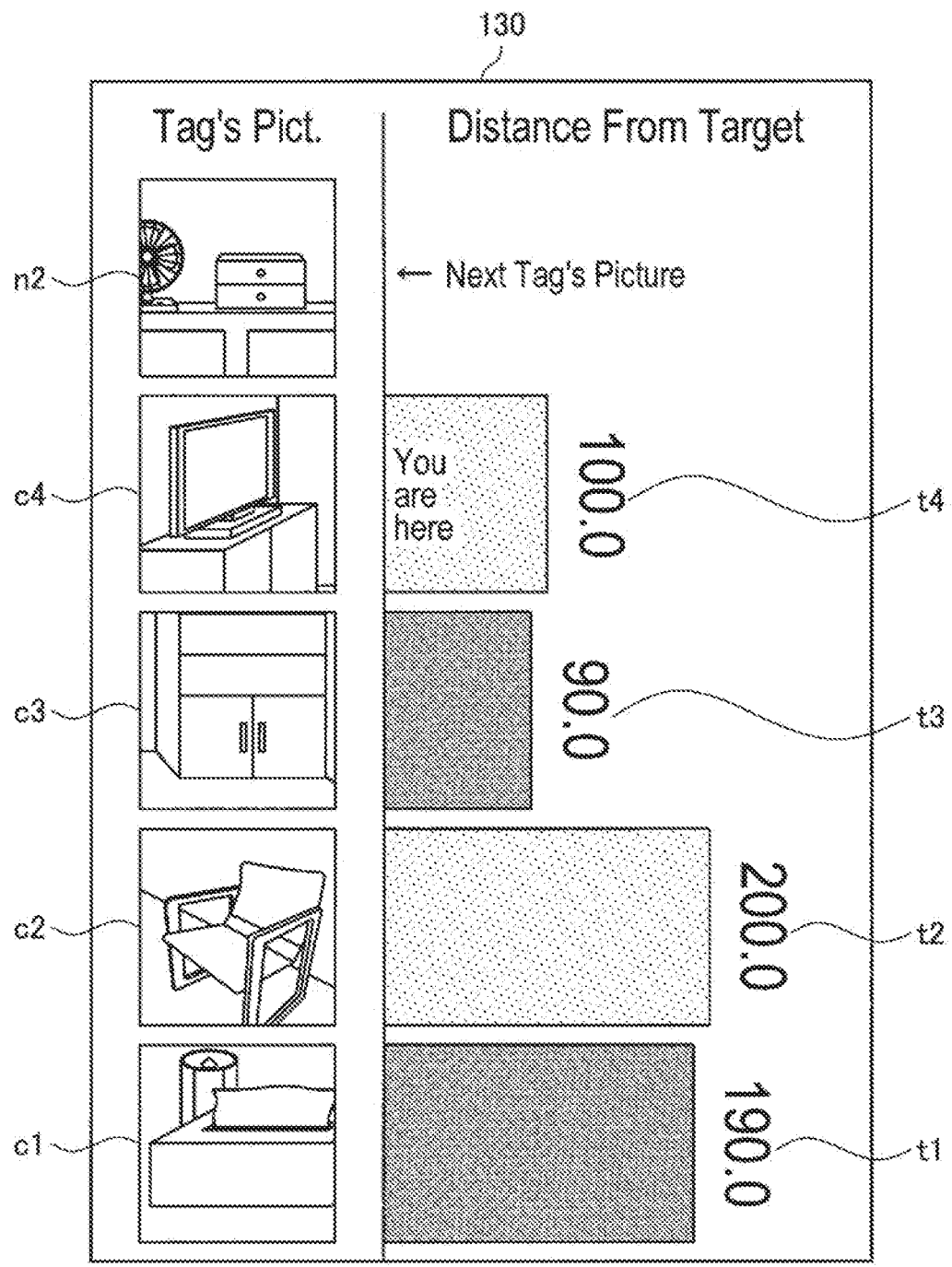
FIG. 15 is an explanatory diagram illustrating an example of a user interface output by the information processing apparatus 100.

FIG. 15 is an explanatory diagram illustrating an example of a user interface output by the information processing apparatus 100. FIG. 15 illustrates a state in which a user interface displayed when the user has scanned RFID tags 10 four times using the reader 20 since the user has input an object that the user desires to search for is output on the output unit 130.

When the user scans RFID tags 10 using the reader 20, the information processing apparatus 100 outputs images c1 to c4 captured by the imaging unit 150 in accordance with the scanning, to the user interface. In addition, when the user scans RFID tags 10 using the reader 20, the information processing apparatus 100 acquires an image n2 corresponding to a RFID tag 10 to be scanned next by the user using the reader 20, and shortest distances t1 to t4 between the RFID tags 10 corresponding to the target tag ID, from the server apparatus 200, and outputs the image n2 and the shortest distances t1 to t4 to the user interface.

By thus outputting, to the user interface, histories of images captured by the imaging unit 150 in accordance with the scanning, and shortest distances between the RFID tags 10 corresponding to the target tag ID, the information processing apparatus 100 can present to the user that the shortest distance to a search target object is getting close or getting away.

Note that the information processing apparatus 100 may vary a color of a bar chart in a user interface between a case where the shortest distance to the search target object is made shorter by the scanning than that in the previous scanning, and a case where the shortest distance is made longer.

Another example of a user interface output by the information processing apparatus 100 is illustrated. For example, an image corresponding to a RFID tag 10 to be scanned next by the user using the reader 20, and information regarding a shortest distance between the RFID tag 10 corresponding to the target tag ID may be superimposed on an image being captured by the imaging unit 150.

Figure 16:
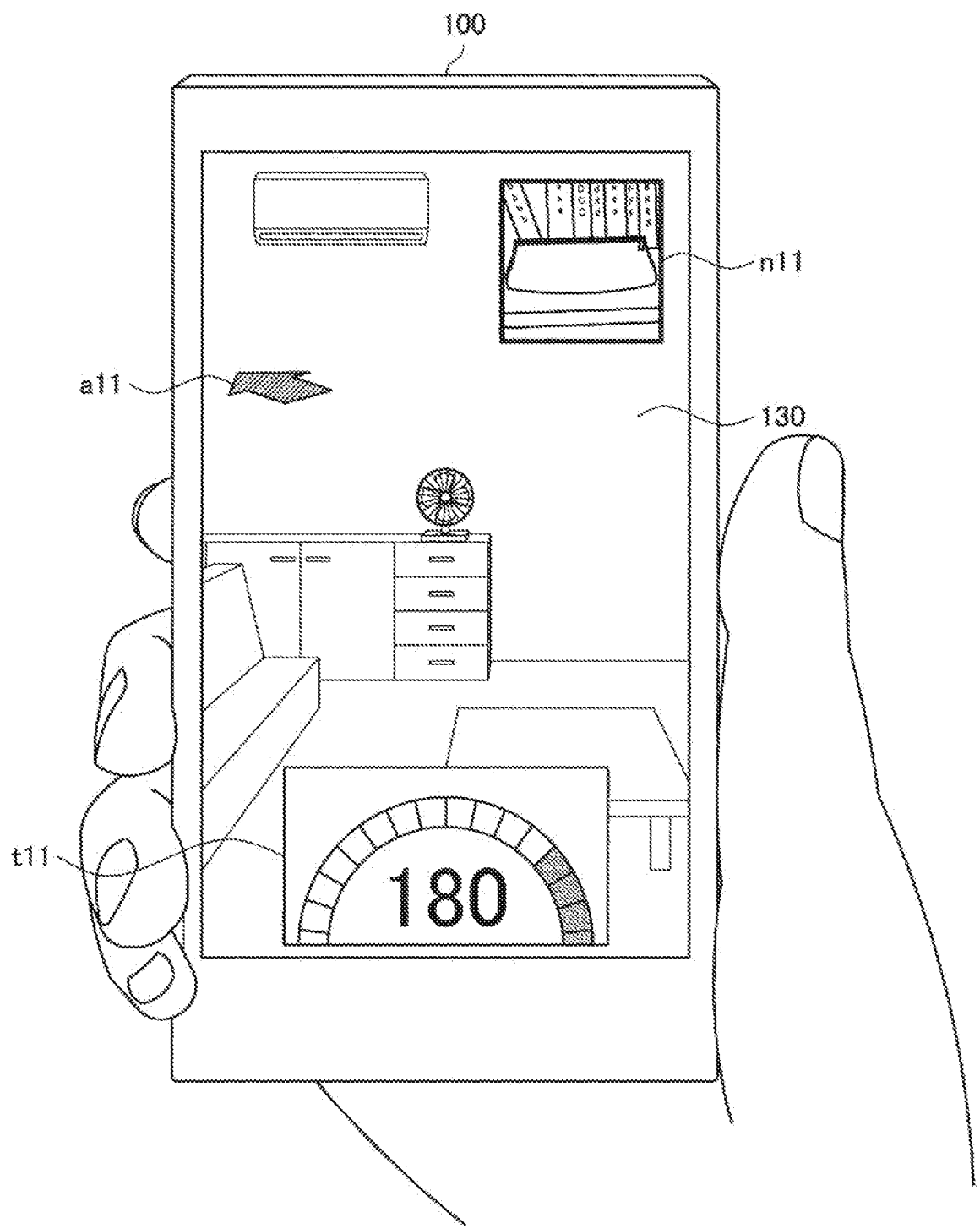
FIG. 16 is an explanatory diagram illustrating an example of a user interface output by the information processing apparatus 100.

FIG. 16 is an explanatory diagram illustrating an example of a user interface output by the information processing apparatus 100. FIG. 16 illustrates an example of a user interface in which an image n11 corresponding to a RFID tag 10 to be scanned next by the user using the reader 20, information t11 regarding a shortest distance between a RFID tag 10 corresponding to the target tag ID, and an arrow a11 indicating the direction of the RFID tag 10 are superimposed on an image being captured by the imaging unit 150.

The arrow a11 indicating the direction of the RFID tag 10 can be displayed on the basis of sensing data of the sensor unit 160 that is obtainable at the time of scanning of the RFID tag 10 using the reader 20, and particularly on the basis of position information, for example. The position information can be obtained using the GNSS, Wi-Fi, a beacon, and the like. In addition, if there are RFID tags 10 consecutively scanned from the user's past scanning tendency of RFID tags 10, a direction between RFID tags 10 can be estimated from sensing data obtainable in each scanning.

Figure 17:
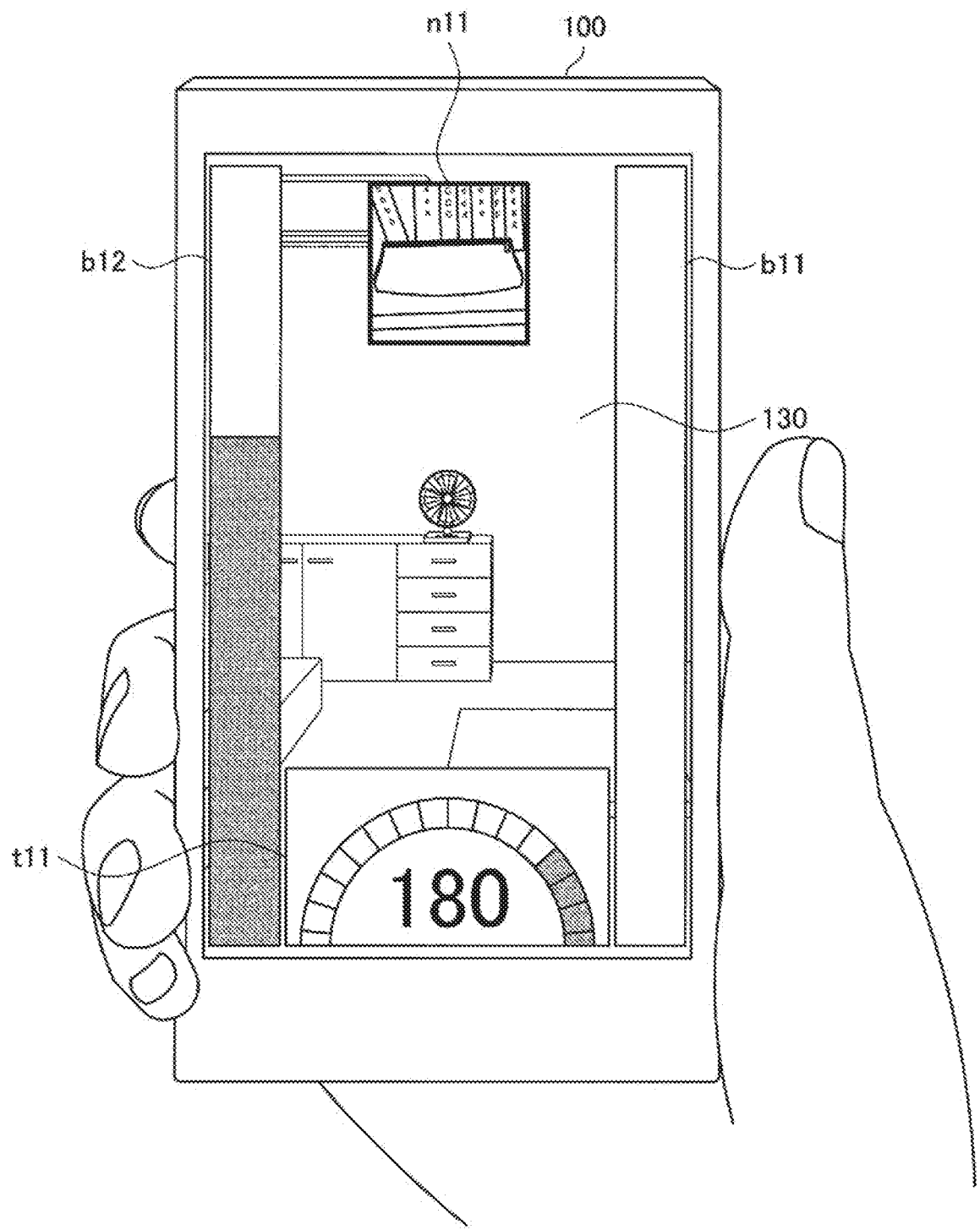
FIG. 17 is an explanatory diagram illustrating an example of a user interface output by the information processing apparatus 100.

FIG. 17 is an explanatory diagram illustrating an example of a user interface output by the information processing apparatus 100. FIG. 17 illustrates an example of a user interface in which an image n11 corresponding to a RFID tag 10 to be scanned next by the user using the reader 20, information t11 regarding a shortest distance between a RFID tag 10 corresponding to the target tag ID, and bar charts b11 and b12 indicating the direction of the RFID tag 10 are superimposed on an image being captured by the imaging unit 150. One of the bar charts b11 and b12 that is located in the direction of the RFID tag 10 to be scanned next by the user using the reader 20 is colored.

Figure 18:
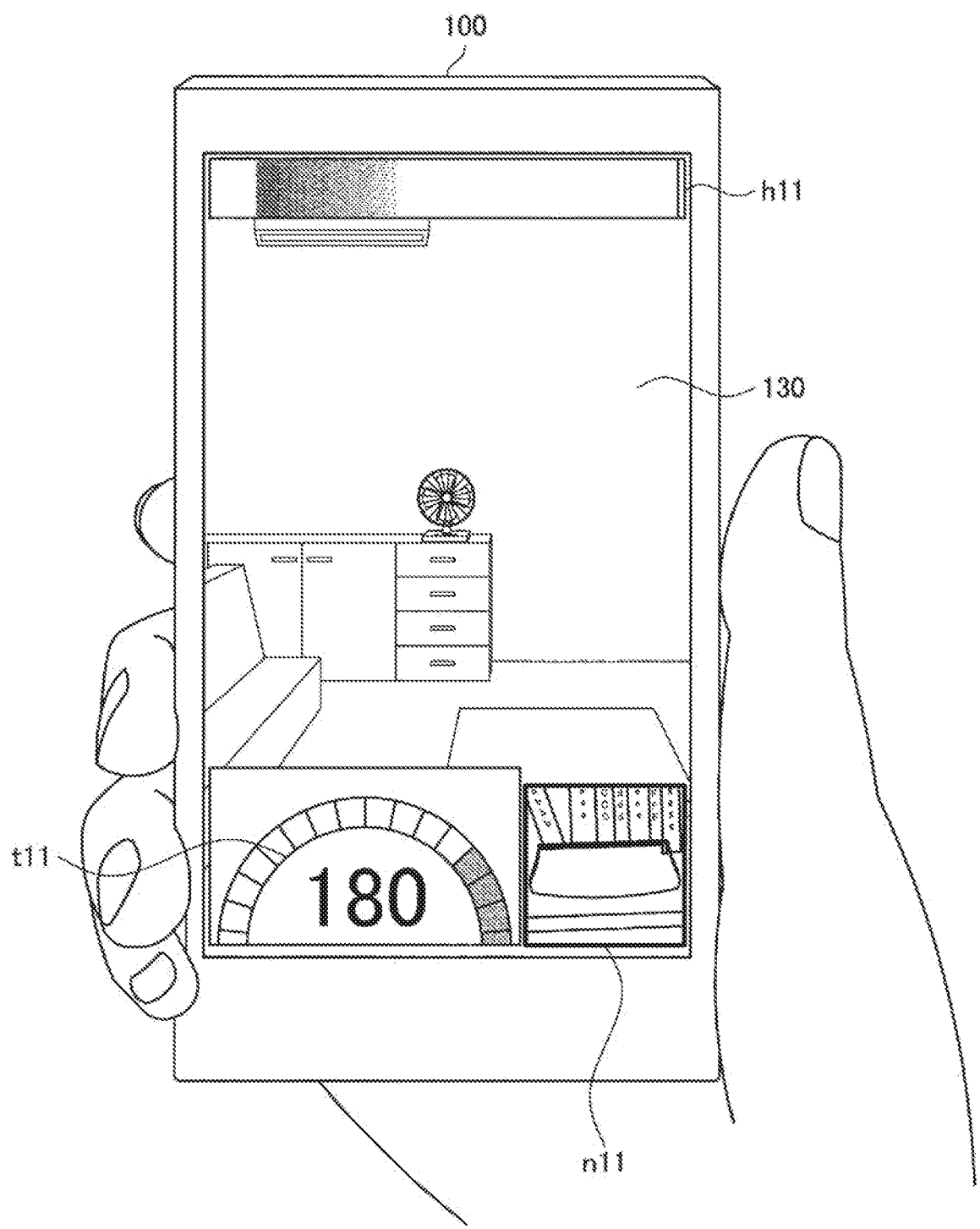
FIG. 18 is an explanatory diagram illustrating an example of a user interface output by the information processing apparatus 100.

FIG. 18 is an explanatory diagram illustrating an example of a user interface output by the information processing apparatus 100. FIG. 18 illustrates an example of a user interface in which an image n11 corresponding to a RFID tag 10 to be scanned next by the user using the reader 20, information t11 regarding a shortest distance between a RFID tag 10 corresponding to the target tag ID, and a heat map h11 indicating the direction of the RFID tag 10 are superimposed on an image being captured by the imaging unit 150. The heat map h11 is colored in such a manner that a color in the direction of the RFID tag 10 to be scanned next by the user using the reader 20 becomes darker.

By thus superimposing various types of information on an image being captured by the imaging unit 150, the information processing apparatus 100 can give the following effects to the user interface, for example.

For example, when the information processing apparatus 100 gets close to a RFID tag 10 to be scanned next by the user using the reader 20, the information processing apparatus 100 may add an effect of illuminating a location of the RFID tag 10 in an image being captured by the imaging unit 150, and or perform such an animation display that a frame becomes smaller toward the location, on an image being captured by the imaging unit 150.

In addition, in a case where scanning of a RFID tag 10 is not started soon such as a case where the user has got lost, even if a shortest distance between a RFID tag 10 corresponding to the target tag ID is 0, the information processing apparatus 100 may output, on the output unit 130, a user interface that navigates the user to the target RFID tag 10, on the basis of sensing data obtained at the time of the past scanning.

Examples of user interfaces displayed on the information processing apparatus 100 having a smartphone form have been illustrated heretofore, but the information processing apparatus 100 can have various forms other than a smartphone as described above. Thus, needless to say, a user interface output by the information processing apparatus 100 is also displayed in an appropriate form in accordance with the device.

Examples of visually presenting information regarding a RFID tag 10 to be scanned next by the user using the reader 20 have been illustrated heretofore, but the present disclosure is not limited to the examples. The information regarding a RFID tag 10 to be scanned next using the reader 20 may be aurally presented or may be haptically presented. In other words, the information may be presented by sound or may be presented by vibration.

In the case of presenting the information by vibration, the information processing apparatus 100 may vary a vibration pattern in accordance with a distance between a RFID tag 10 to be scanned next and the information processing apparatus 100. In addition, in the case of presenting the information by vibration, the information processing apparatus 100 may convey, by vibration, the direction of a RFID tag 10 to be scanned next. For example, in a case where the information processing apparatus 100 includes a plurality of actuators, the information processing apparatus 100 may convey the direction to the user by varying a vibration pattern of each actuator.

In the case of presenting the information by sound, the information processing apparatus 100 may vary a ring pattern of sound in accordance with a distance between a RFID tag 10 to be scanned next and the information processing apparatus 100. In addition, in the case of presenting the information by sound, the information processing apparatus 100 may convey, by voice, the direction of a RFID tag 10 to be scanned next.

Note that, in the present embodiment, an example in which the reader 20 and the information processing apparatus 100 are separate apparatuses has been illustrated, but the present disclosure is not limited to this example. The information processing apparatus 100 may be provided with a function of reading a RFID tag 10.

In addition, in the present embodiment, information regarding a tag to be read next is output by the information processing apparatus 100, but the present disclosure is not limited to this example. For example, the reader 20 may be provided with a function of outputting information regarding a tag to be read next.

In addition, in the present embodiment, the user is caused to effectively perform searching by causing the reader 20 to read a RFID tag 10, but the present disclosure is not limited to this example. For example, instead of scanning a RFID tag 10, the imaging unit 150 may be caused to capture an image of a marker having a predetermined shape such as a two-dimensional bar-code, for example. In addition, for example, instead of scanning a RFID tag 10, the imaging unit 150 may be caused to capture an image of an object that the user desires to search for, or a characteristic object in the room, as a marker. A captured image of the object is analyzed by the server apparatus 200, for example, whereby an image of which object has been captured can be identified.

2. Hardware Configuration Example

Figure 19:
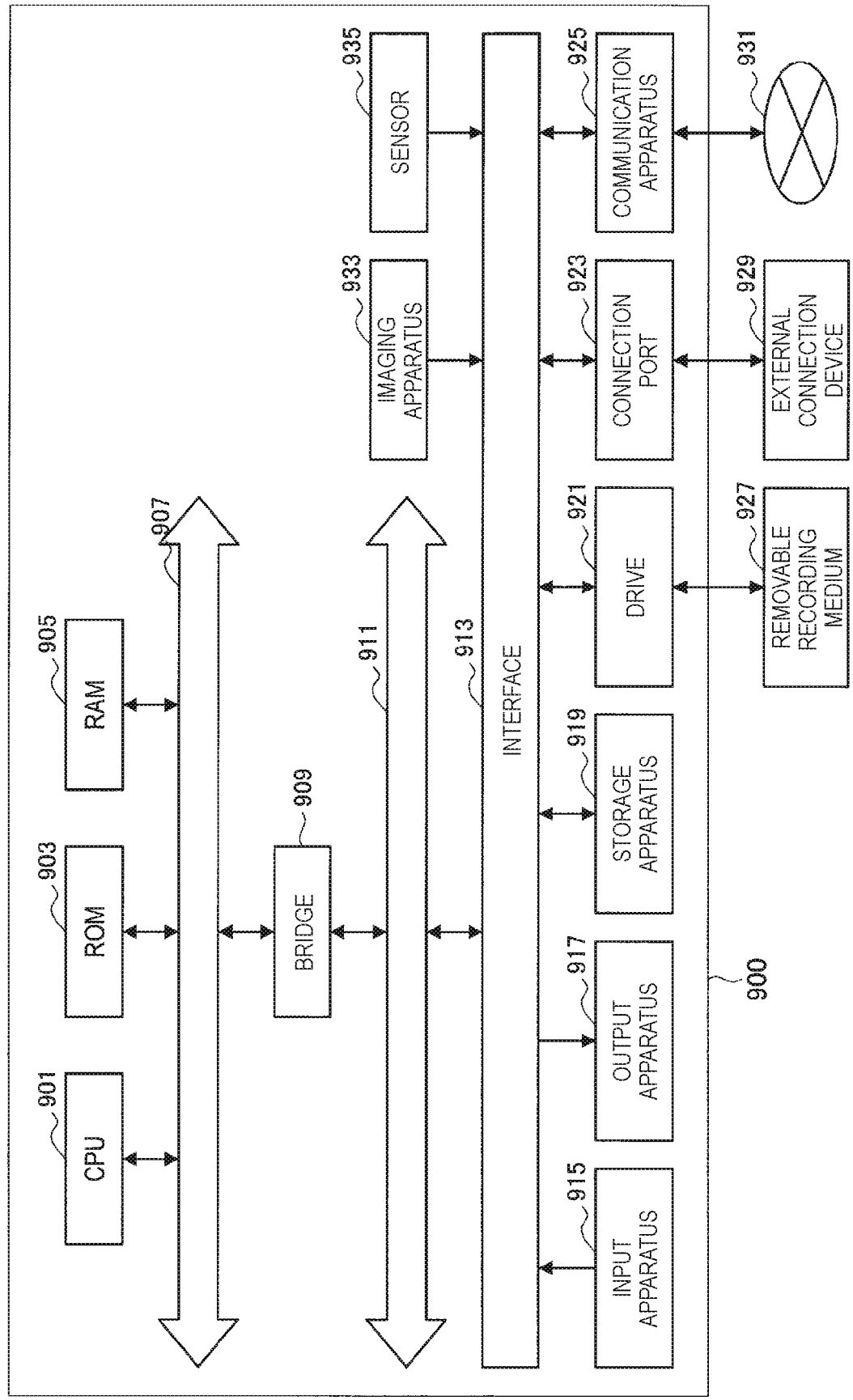
FIG. 19 is an explanatory diagram illustrating a hardware configuration example of the information processing apparatus 100.

Next, with reference to FIG. 19, a hardware configuration of an information processing apparatus according to an embodiment of the present disclosure is explained. FIG. 19 is a block diagram illustrating a hardware configuration example of an information processing apparatus according to the embodiment of the present disclosure.

The information processing apparatus 900 includes a central processing unit (CPU) 901, read only memory (ROM) 903, and random access memory (RAM) 905. In addition, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925. Moreover, the information processing apparatus 900 may include an imaging apparatus 933, and a sensor 935, as necessary. The information processing apparatus 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing apparatus and a control apparatus, and controls the overall operation or a part of the operation of the information processing apparatus 900 according to various programs recorded in the ROM 903, the RAM 905, the storage apparatus 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 configured from an internal bus such as a CPU bus or the like. Further, the host bus 907 is connected to the external bus 911 such as a Peripheral Component Interconnect/Interface (PCI) bus via the bridge 909.

The input apparatus 915 is an apparatus operated by a user such as a mouse, a keyboard, a touch panel, a button, a switch, and a lever. The input apparatus 915 may be a remote control apparatus that uses, for example, infrared radiation and another type of radio wave. Alternatively, the input apparatus 915 may be an external connection device 929 such as a mobile phone that corresponds to an operation of the information processing apparatus 900. The input apparatus 915 includes an input control circuit that generates input signals on the basis of information which is input by a user to output the generated input signals to the CPU 901. A user inputs various types of data to the information processing apparatus 900 and instructs the information processing apparatus 900 to perform a processing operation by operating the input apparatus 915.

The output apparatus 917 includes an apparatus that can report acquired information to a user visually, audibly, or haptically. The output apparatus 917 may be, for example, a display apparatus such as a liquid crystal display (LCD) or an organic electro-luminescence display, an audio output apparatus such as a speaker or a headphone, or a vibrator. The output apparatus 917 outputs a result obtained through a process performed by the information processing apparatus 900, in the form of video such as text and an image, sounds such as voice and audio sounds, or vibration.

The storage apparatus 919 is an apparatus for data storage that is an example of a storage unit of the information processing apparatus 900. The storage apparatus 919 includes, for example, a magnetic storage device such as a hard disk drive (HDD), a semiconductor storage device, an optical storage device, or a magneto-optical storage device. The storage apparatus 919 stores therein the programs and various data executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing apparatus 900. The drive 921 reads out information recorded on the mounted removable recording medium 927, and outputs the information to the RAM 905. Further, the drive 921 writes the record into the mounted removable recording medium 927.

The connection port 923 is a port used to connect devices to the information processing apparatus 900. The connection port 923 may include a Universal Serial Bus (USB) port, an IEEE1394 port, and a Small Computer System Interface (SCSI) port. The connection port 923 may further include an RS-232C port, an optical audio terminal, a High-Definition Multimedia Interface (HDMI) (registered trademark) port, and so on. The connection of the external connection device 929 to the connection port 923 makes it possible to exchange various data between the information processing apparatus 900 and the external connection device 929.

The communication apparatus 925 is a communication interface including, for example, a communication device for connection to a communication network 931. The communication apparatus 925 may be, for example, a communication card for a local area network (LAN), Bluetooth (registered trademark), Wi-Fi, or a wireless USB (WUSB). The communication apparatus 925 may also be, for example, a router for optical communication, a router for asymmetric digital subscriber line (ADSL), or a modem for various types of communication. For example, the communication apparatus 925 transmits and receives signals in the Internet or transits signals to and receives signals from another communication device by using a predetermined protocol such as TCP/IP. The communication network 931 to which the communication apparatus 925 connects is a network established through wired or wireless connection. The communication network 931 may include, for example, the Internet, a home LAN, infrared communication, radio communication, or satellite communication.

The imaging apparatus 933 is an apparatus that captures an image of a real space by using an image sensor such as a charge coupled device (CCD) and a complementary metal oxide semiconductor (CMOS), and various members such as a lens for controlling image formation of a subject image onto the image sensor, and generates the captured image. The imaging apparatus 933 may capture a still image or a moving image.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing apparatus 900 such as a posture of a housing of the information processing apparatus 900, and information regarding an environment surrounding the information processing apparatus 900 such as luminous intensity and noise around the information processing apparatus 900. The sensor 935 may include a GPS receiver that receives global positioning system (GPS) signals to measure latitude, longitude, and altitude of the apparatus.

An example of a hardware configuration of the information processing apparatus 900 has been illustrated above. Note that a hardware configuration of the information processing apparatus 900 can be appropriately changed in accordance with a technology level in each implementation.

3. Conclusion

As described above, according to an embodiment of the present disclosure, the information processing apparatus 100 that can navigate the user to a location that the user is to target, by scanning of a RFID tag, and the server apparatus 200 that presents information to the information processing apparatus 100 are provided.

The information processing apparatus 100 according to an embodiment of the present disclosure can present information regarding a RFID tag 10 that the user is to target next, in accordance with the user holding the reader 20 over a RFID tag 10. At this time, the user needs not register information regarding the RFID tag 10, and the user is only required to hold the reader 20 over the RFID tag 10. In other words, according to the present embodiment, a registration work of information regarding a tag that has been bothersome and has imposed a burden on the user in a searching assistance system that uses a RFID tag becomes unnecessary. Thus, such a burden and bothersome work of the user can be reduced.

For example, when using the system of the present embodiment, the user needs not register a position of a RFID tag and a name of an object to which the RFID tag is attached. This is because the position of the RFID tag can be determined by the user by tracking RFID tags having shorter relative distances, and the name can be determined by the user by seeing a photograph.

In addition, the server apparatus 200 according to an embodiment of the present disclosure acquires information regarding RFID tags 10 and images of RFID tags 10 that have been transmitted from the information processing apparatus 100. Then, the server apparatus 200 according to an embodiment of the present disclosure can calculate a relative distance between the RFID tags 10 on the basis of the acquired information, and present, to the information processing apparatus 100, information regarding a RFID tag 10 to be scanned next, and information regarding a shortest distance to a RFID tag 10 corresponding to a target object.

Steps in the process executed by each apparatus of the present specification need not always be chronologically processed in accordance with the order described as a sequence diagram or a flow chart. For example, steps in the process executed by each apparatus may be processed in an order different from the order described as a flow chart, or may be concurrently processed.

In addition, a computer program for causing hardware such as a CPU, a ROM, and a RAM that is incorporated in each apparatus, to execute a function equivalent to the above-described configuration of each apparatus can also be created. In addition, a storage medium storing the computer program can also be provided. In addition, by forming each functional block illustrated in a functional block diagram, by hardware or a hardware circuit, a series of processes can also be implemented by hardware or a hardware circuit.

In addition, a part or all of functional blocks illustrated in a functional block diagram used in the above description may be implemented by a server apparatus connected via a network such as the internet, for example. In addition, configurations of functional blocks illustrated in a functional block diagram used in the above description may be implemented by a single apparatus, or may be implemented by a system in which a plurality of apparatuses cooperate. The system in which a plurality of apparatuses cooperate can include a combination of a plurality of server apparatuses, a combination of a server apparatus and an information processing apparatus, and the like, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

For example, in the above-described embodiment, an example of assisting searching in the room of the user has been illustrated, but the present disclosure is not limited to the example. For example, the present technology can also be applied in assisting a driver driving an automobile, to travel to a destination. For example, it becomes possible to apply the present technology to the case of presenting, when a camera equipped in the automobile captures an image of the periphery, and captures an image of an object that can serve as a predetermined marker, information regarding a next marker located before a destination, to a car navigation system in the automobile.

Additionally, the present technology may also be configured as below.

(1) An information processing apparatus including:
a provision unit configured to provide marker information obtained when a marker on a route to a destination has been read, and information regarding an image captured when the marker has been read; and
an acquisition unit configured to acquire information regarding a marker to be read next, the information being generated on the basis of the provided marker information.

(2) The information processing apparatus according to (1), further including
an output unit configured to output the information regarding a marker to be read next, on the basis of the information acquired by the acquisition unit.

(3) The information processing apparatus according to (2), in which the output unit outputs the information regarding a marker to be read next, by an image.

(4) The information processing apparatus according to (2), in which the output unit outputs the information regarding a marker to be read next, by a graph.

(5) The information processing apparatus according to (2), in which the output unit outputs the information regarding a marker to be read next, by sound.

(6) The information processing apparatus according to (2), in which the output unit outputs the information regarding a marker to be read next, by vibration.

(7) The information processing apparatus according to any one of (1) to (6), in which the acquisition unit acquires, as the information regarding a marker to be read next, an image corresponding to the marker.

(8) The information processing apparatus according to any one of (1) to (6), in which the acquisition unit acquires, as the information regarding a marker to be read next, information regarding a positional relationship between the markers.

(9) An information processing apparatus including:
an acquisition unit configured to acquire marker information obtained when a marker on a route to a destination has been read, and information regarding an image captured when the marker has been read; and
a provision unit configured to provide information regarding a marker to be read next, the information being generated on the basis of the marker information acquired by the acquisition unit.

(10) The information processing apparatus according to (9), further including
a control unit configured to generate information regarding a positional relationship between the markers, on the basis of the marker information acquired by the acquisition unit.

(11) The information processing apparatus according to (10), in which the provision unit provides, as the information regarding a marker to be read next, information regarding a marker to be read next that has been derived from the information regarding the positional relationship that has been generated by the control unit.

(12) The information processing apparatus according to (10), in which the provision unit provides, as the information regarding a marker to be read next, the information regarding the positional relationship that has been generated by the control unit.

(13) The information processing apparatus according to any one of (9) to (12), in which the provision unit provides, as the information regarding a marker to be read next, an image corresponding to the marker.

(14) An information processing method including:
providing marker information obtained when a marker on a route to a destination has been read, and information regarding an image captured when the marker has been read; and
acquiring information regarding a marker to be read next, the information being generated on the basis of the provided marker information.

(15) An information processing method including:
acquiring marker information obtained when a marker on a route to a destination has been read, and information regarding an image captured when the marker has been read; and
providing information regarding a marker to be read next, the information being generated on the basis of the acquired marker information.

(16) A computer program for causing a computer to execute:
providing marker information obtained when a marker on a route to a destination has been read, and information regarding an image captured when the marker has been read; and
acquiring information regarding a marker to be read next, the information being generated on the basis of the provided marker information.

(17) A computer program for causing a computer to execute:
acquiring marker information obtained when a marker on a route to a destination has been read, and information regarding an image captured when the marker has been read; and
providing information regarding a marker to be read next, the information being generated on the basis of the acquired marker information.

REFERENCE SIGNS LIST

1 information processing system
100 information processing apparatus
200 server apparatus
300 database

The invention claimed is:
1. An information processing apparatus, comprising:
an acquisition unit configured to acquire marker information of a first marker read on a route to a destination;
an imaging unit configured to capture an image of an ambient environment corresponding to the first marker, wherein the image is captured based on the acquisition of the marker information of the first marker read on the route to the destination; and
a provision unit configured to transmit the acquired marker information of the first marker read on the route to the destination and the captured image of the ambient environment corresponding to the first marker to a server, wherein the acquisition unit is further configured to acquire marker information of a second marker from the server, wherein the second marker is to be read next to the first marker read on the route to the destination, and the marker information of the second marker is generated based on the marker information of the first marker.

2. The information processing apparatus according to claim 1, further comprising an output unit configured to output the marker information of the second marker based on the acquired marker information of the second marker.

3. The information processing apparatus according to claim 2, wherein the output unit is further configured to output the marker information of the second marker based on an image of the second marker.

4. The information processing apparatus according to claim 2, wherein the output unit is further configured to output the marker information of the second marker based on a graph.

5. The information processing apparatus according to claim 2, wherein the output unit is further configured to output the marker information of the second marker based on a sound corresponding to the second marker.

6. The information processing apparatus according to claim 2, wherein the output unit is further configured to output the marker information of the second marker based on vibration.

7. The information processing apparatus according to claim 1, wherein the acquisition unit is further configured to acquire an image corresponding to the second marker as the marker information of the second marker.

8. The information processing apparatus according to claim 1, wherein the acquisition unit is further configured to acquire information regarding a positional relationship between the first marker and the second marker as the marker information of the second marker.

9. An information processing apparatus, comprising:

an acquisition unit configured to acquire marker information of a first marker read on a route to a destination and a captured image of an ambient environment corresponding to the first marker read on the route;

a processing unit configured to generate marker information of a second marker based on the acquired marker information of the first marker, wherein the second marker is to be read next to the first marker read on the route to the destination; and a provision unit configured to transmit the marker information of the second marker.

10. The information processing apparatus according to claim 9, further comprising a control unit configured to generate first information corresponding to a positional relationship between the first marker and the second marker based on the acquired marker information of the first marker.

11. The information processing apparatus according to claim 10, wherein the provision unit is further configured to transmit, as the marker information of the second marker, second information derived from the generated first information corresponding to the positional relationship.

12. The information processing apparatus according to claim 10, wherein the provision unit is further configured to transmit, as the marker information of the second marker, the first information corresponding to the positional relationship.

13. The information processing apparatus according to claim 9, wherein the provision unit is further configured to transmit, as the marker information of the second marker, an image corresponding to the second marker.

14. An information processing method, comprising:

acquiring marker information of a first marker read on a route to a destination;

capturing an image of an ambient environment corresponding to the first marker, wherein the image is captured based on acquiring the marker information of the first marker read on the route to the destination;

transmitting, to a server, the acquired marker information of the first marker read on the route to the destination and the captured image of the ambient environment corresponding to the first marker; and acquiring marker information of a second marker from the server, wherein the second marker is to be read next to the first marker read on the route to the destination, and the marker information of the second marker is generated based on the marker information of the first marker.

15. An information processing method, comprising:

acquiring marker information of a first marker read on a route to a destination, and a captured image of an ambient environment corresponding to the first marker read;

generating marker information of a second marker based on the acquired marker information of the first marker, wherein the second marker is to be read next to the first marker read on the route to the destination; and transmitting the marker information of the second marker.

16. A non-transitory computer-readable medium having stored thereon, computer-executable instructions, which when executed by a computer, cause the computer to execute operations, the operations comprising:

acquiring marker information of a first marker read on a route to a destination;

capturing an image of an ambient environment corresponding to the first marker, wherein the image is captured based on acquiring the marker information of the first marker read on the route to the destination;

transmitting, to a server, the acquired marker information of the first marker read on the route to the destination and the captured image of the ambient environment corresponding to the first marker; and acquiring marker information of a second marker from the server, wherein the second marker is to be read next to the first marker on the route to the destination, and the marker information of the second marker is generated based on the marker information of the first marker.

17. A non-transitory computer-readable medium having stored thereon, computer-executable instructions, which when executed by a computer, cause the computer to execute operations, the operations comprising:

acquiring marker information of a first marker read on a route to a destination, and a captured image of an ambient environment corresponding to the first marker read;

generating marker information of a second marker based on the acquired marker information of the first marker, wherein the second marker is to be read next to the first marker read on the route to the destination; and
transmitting the marker information of the second marker.

* * * * *